United States Patent [19]

Stauffer

[11] 4,184,968
[45] Jan. 22, 1980

[54] AUTO FOCUS SYSTEM

[75] Inventor: Norman L. Stauffer, Englewood, Colo.

[73] Assignee: Honeywell Inc., Minneapolis, Minn.

[21] Appl. No.: 876,972

[22] Filed: Feb. 13, 1978

[51] Int. Cl.² ............................................. G01J 1/20
[52] U.S. Cl. ................................. 250/201; 250/204; 354/25
[58] Field of Search .............. 250/201, 204, 208, 209, 250/214 R, 214 P; 356/1, 4, 5; 354/25

[56] References Cited

U.S. PATENT DOCUMENTS

| 3,274,914 | 9/1966 | Biederman et al. | 354/25 |
|---|---|---|---|
| 3,450,883 | 6/1969 | Thomas | 250/204 |
| 3,684,374 | 8/1972 | Humphrey | 356/4 |
| 3,836,772 | 9/1974 | Stauffer | 250/204 |
| 3,838,275 | 9/1974 | Stauffer | 250/204 |
| 3,945,023 | 3/1976 | Stauffer | 354/25 |
| 3,958,117 | 5/1976 | Stauffer | 250/201 |
| 4,002,899 | 1/1977 | Stauffer | 250/209 |

Primary Examiner—David C. Nelms
Attorney, Agent, or Firm—Charles J. Ungemach

[57] ABSTRACT

An auto focus system includes first and second detector arrays which receive first and second detection images of an object. The detection images are displaced from each other by a distance which depends upon the distance to a remote object. The detector arrays produce output signals which vary with the position of the detection images and thus with the distance to the object. The output signals are processed to provide a resultant signal indicative of the distance to the object and this signal may be used, for example, to control the position of a lens in a photographic camera.

21 Claims, 5 Drawing Figures

AUTO FOCUS SYSTEM

BACKGROUND OF THE INVENTION

The present invention relates generally to apparatus for providing a measure of the distance between the apparatus and a remote object and has particular importance in fields of distance determination and automatic focusing of, for example, photographic or television cameras.

Distance determining and automatic focusing arrangements have received considerable attention in recent years. One advantageous type of distance determining automatic focusing apparatus is the spatial image correlation type. Examples of the different forms of arrangements of this type can be found in my U.S. Pat. Nos. 3,836,772; 3,838,275; 3,958,117 and 4,002,899 and in U.S. Pat. No. 3,274,914 by Biedermann, et al.

The typical spatial image correlation apparatus includes two auxiliary optical elements (e.g., lenses or mirrors) and two detector arrays upon which images from a remote object are formed by the optical elements. The object distance is determined by relatively moving one of the auxiliary optical elements so as to change the relative position of the images on the radiation responsive detector arrays until they occupy a critical or correlation position. This position is a measure of the existing object to apparatus distance.

The relative movement of the auxiliary optical element occurs for each distance measuring or focusing operation and the critical condition occurs when there is best correspondence between the radiation distributions of detection images formed on the two detector arrays. This condition of best distribution correspondence results in a unique value or effect in the processed electrical output signals.

In most systems, the relative movement of the auxiliary optical element with respect to the detector array is achieved by moving the lens or mirror relative to one of the detector arrays. The particular position of the element when best distribution correspondence occurs provides a determination of the existing object apparatus distance. In an automatic focusing system, the position of the auxiliary optical element at the time of correlation is used to control the position of a primary optical element such as the taking lens of a camera.

Although distance determining and automatic focusing arrangements of this type have many advantages, they also have some disadvantages. In particular, the required movement of an auxiliary optical element and the accurate determination of the position of the element when correlation occurs leads to considerable mechanical and electrical complexity. It also requires some form of motive means to provide the motion of the auxiliary element. This can create a problem, particularly in automatic focusing cameras where size and weight constraints are critical. The additional complexity and the requirement of some form of motive means increases cost as well as weight and size and increases the likelihood of mechanical failure.

In my U.S. Pat. No. 3,945,023 and in my copending application Ser. No. 696,170, filed June 14, 1976, I describe distance determining and automatic focusing apparatus which does not require a scanning mirror or lens. The outputs of detectors in two detector arrays are compared and processed to provide an indication of distance to an object in terms of one of a plurality of zones. The primary lens is moved to a particular zone depending upon the result of this processing. While these systems do not require a scanning mirror or lens, they become difficult to implement in practice. For example, in Patent No. 3,945,023, the size of the zones for focusing are relatively large which results in low accuracy. While the accuracy of this system may be increased by increasing the number of zones, this results in a large number of detector elements which in turn require more space and results in a much larger and more complex processing circuit. In my copending application, Ser. No. 696,170, I utilize a large number of detector elements in a somewhat less complex processing circuit but still the large number of detectors create considerable difficulty when it is desired to fit them into a reasonably small array, while reduction of individual detector size is possible, when the size of the individual elements becomes small, the output signals therefrom likewise become small and quite difficult to process. Thus, although the size of detectors may be decreased so as to arrange them in satisfactorily small arrays, each decrease in size produces a decrease in output signal and ultimately a point is reached where the size of the signal from the individual detector becomes so small it is masked by noise and becomes too difficult to process.

SUMMARY OF THE INVENTION

The apparatus of the present invention overcomes the problems encountered in the prior art by providing detector arrays in which individual detecting elements thereof are made small enough to allow for satisfactory miniaturization of the entire array, thus producing smaller size zones and increased accuracy. To overcome the problem of the small size of output signal, the individual detector elements are connected together in a unique manner so that their output signals are summed to thus provided the resultant signal of sufficient size to enable satisfactory signal processing.

DETAILED DESCRIPTION OF THE PREFERRED EMBODIMENTS

Figure 1:
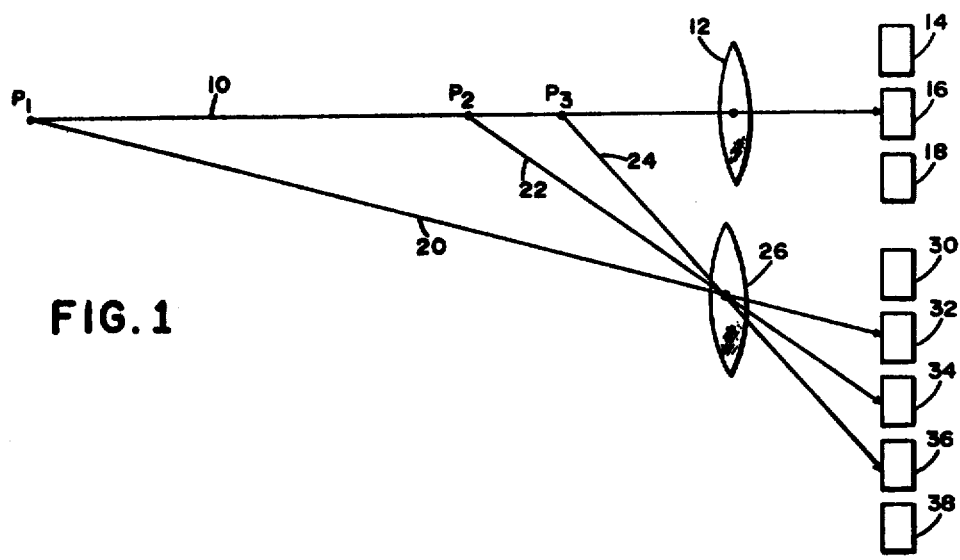
FIG. 1 shows the optical components of a distance determining apparatus of the prior art.

In FIG. 1, the optical arrangement of lenses and detectors for an automatic focusing system of the prior art such as is found in my U.S. Pat. No. 3,945,023 is shown. Three distinct positions P1, P2 and P3, of a remotely located object are indicated along a first light path identified by reference numeral 10. Radiation from an object which may be located at these positions along light path 10 will pass through a first stationary lens means 12 and will fall on detector elements 14, 16 and 18 of a first detector array located in the camera or other apparatus.

The individual detectors described herein may be photo diodes and may be individually constructed and assembled or may be created from a larger photo diode and divided such as by etching into the smaller units shown. In actual practice, the size of the surface of each photo diode detector is about 0.045 inches by 0.0045 inches and the space between adjacent detectors is about 0.0005 inches. Other types of detectors such as charge coupled devices (CCD's) may also be employed.

Depending upon the position of the remote object, radiation from that object will also pass along one of the light paths shown by reference numerals 20, 22 and 24, and will pass through a second stationary lens means 26 so as to fall on detectors 30, 32, 34, 36 and 38 of a second detector array located in the camera or other apparatus. In FIG. 1, the three light paths 20, 22 and 24, are shown emanating from the positions P1, P2 and P3, respectively. If an object is located at the position P3, for example, radiation therefrom will pass through the first lens device 12 and will fall on the first detector array made up of detectors 14, 16 and 18. That radiation may or may not form a focused image of the object on the detector array, it not being essential that a focused image be so formed, but an intensity distribution will be formed on the first detector array and that distribution will be centered on the detecting element 16. Radiation from the object at position P3 will also pass along line 24 through the second lens means 26 and fall on the second detection array made up of detectors 30, 32, 34, 36 and 38 and will form a second radiation intensity distribution over the second array which, again, need not be in focus but which will be centered around detector 36. Therefore, with an object at position P3, the intensity of radiation falling on the detector element 16 in the first array will be substantially equal to the intensity of radiation falling on the detector 36 of the second array since both intensity distribution patterns will be substantially the same. Similarly, the intensity of radiation falling on the detector 18 of the first array will be substantially equal to the intensity of the radiation falling on the detector 38 of the second array and the intensity of radiation falling on the detector 14 of the first array will be substantially equal to the radiation falling on the detector 34 of the second array. Therefore, the circuit means which is shown in Patent No. 3,945,023 matches the intensity distribution falling on the two detector arrays and indicates that the distance to the remote object is generally that of position P3. A signal may then be produced to drive the taking lens of the camera to a position where objects located at that distance will be in focus on the film plane of the camera. Similarly, if the object were located at position P2, the intensity distribution on the second array would be centered around detector 34 and the processing circuitry would produce a signal indicating that the camera need be focused at a position corresponding to P2. If an object were to be located at position P1, the intensity distribution would be centered around detector 32 and the processing circuitry would again produce a signal indicative of this for use by the camera or other equipment to position the taking lens at the appropriate position.

If an object is located between positions P1 and P2, then the radiation intensity on the second detector array will not exactly match the radiation distribution on the first detector array but up to a point about half way between P1 and P2, for example, the pattern centered around detector 32 will more closely equal the pattern on the first detector array than will the pattern centered around detector 34. The range from infinity to about half way between P1 and P2 may be referred to as the far zone. As the object moves closer to position P2, then the pattern centered around detector 34 will be more nearly like that centered around detector 16 on the first array. This situation will continue until the object is a little more than half way between positions P2 and P3. The range from half way between P1 and P2 to half way between P2 and P3 may be referred to as the middle zone. The remaining distance from half way between P2 and P3 to the closest point for camera focus may be referred to as the near zone. Thus, it can be seen that the positions P1, P2 and P3 generally define centers of zones of displacement from the camera so that the taking lens of the camera can be positioned at a corresponding zone to produce an image on the focal plane which is fairly closely in focus. With most cameras, it is not essential that the range finding device determine the exact displacement from the device to the remote object but only that it determine a general displacement from which it can be determined in which of a predetermined number of zones the object is found. Of course, for greater accuracy, a greater number of zones may be used so as to decrease the size of each of the zones but as explained in Patent No. 3,945,023 a larger number of detectors is required and the size of the array must necessarily increase if the individual detectors are to remain the same size. In some cameras, the space limitations will prevent an increase in array size so that it will then become necessary to decrease the size of the individual detectors. Unfortunately, in decreasing detector size, the magnitude of the signal which is produced by that detector also decreases and the signals become difficult or impossible to handle with the signal processing apparatus.

Figure 2:
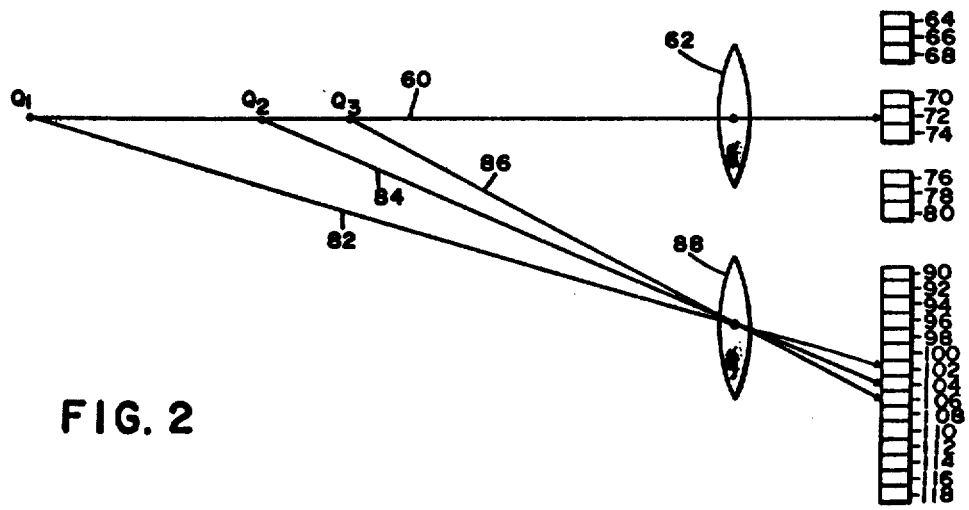
FIG. 2 shows the optical components of the distance determining apparatus of the present invention.

FIG. 2 shows an optical system for use with an automatic focusing device similar to that shown in FIG. 1, except that the detector arrays are arranged in considerably different fashion. Again, in FIG. 2, three distinct positions Q1, Q2 and Q3, are located along a first light path 60 so that radiation from an object located along this light path will pass through a first stationary lens means 62 and fall on a first detector array comprised of nine detectors identified by reference numerals 64, 66, 68, 70, 72, 74, 76, 78 and 80, which are shown arranged in groups of three and the size of each group is shown to be about the same as that of one detector of FIG. 1. Depending upon the position of the object, radiation from the object will also pass along second light paths identified by reference numerals 82, 84 or 86, through a second stationary lens means 88 so as to fall on a second detector array made up of 15 detector elements, identified by reference numerals 90, 92, 94, 96, 98, 100, 102, 104, 106, 108, 110, 112, 114, 116 and 118, which are also arranged in three groups but here each group contains five detectors of the size of the detectors in the first array.

As with FIG. 1, it will be seen that radiation from an object located at a position along light path 60 will be centered about detector element 72. On the other hand, depending upon the position of the object along light path 60, radiation will be centered about either detector 102, 104 or 106 in the middle group of the second detector array. It is seen that because of the smaller size of detector, the size of the zones defined by points Q1, Q2 and Q3 is considerably smaller than those found in FIG. 1, thus providing for greater accuracy than was previously achievable. Of course, as explained above, by reducing the size of the individual detectors, a corresponding reduction in the size of the signals they produce occurs but this is compensated for by summing of the output signals from the detectors in a unique manner which will be later described.

It should be noted in FIG. 2 that the detectors of the first array are arranged in groups of three with a space between each group approximately equal to the width of two detectors while the detectors of the second array are arranged with substantially no spacing between the groups of three. Thus, the overall length of the first detector array will be approximately two detector widths less than the overall length of the second detector array. This spacing is provided so that the radiation distribution patterns falling on 13 l of the 15 detectors of the second array will be substantially the same as the pattern falling on the first detector array. More specifically, it should be noted that radiation falling from an object located at Q1 will be centered around detector element 102 of the second detector array so that the pattern extending up to detector 90 and down to detector 114 will correspond to the radiation pattern falling on the first detector array between detectors 64 and 80. Likewise, an object located at position Q2 will produce a radiation pattern extending from detector 92 to detector 116 of the second array which will be equal to the pattern extending from detector 64 to detector 80 of the first array. Likewise, for an object located at position Q3, the radiation pattern will extend from detector 94 to detector 118 of the second array and this pattern will be substantially the same as that extending from detector 64 to detector 80 of the first array.

As will be explained in further detail in connection with FIG. 3, the patterns falling on the two detector arrays are compared to determine greatest coincidence or similarity and thus determine in which of the several zones surrounding the positions Q1, Q2 and Q3, the object is located.

Assume, for example, that an object is located at position Q3 along radiation path 60 so that its radiation will form a distribution pattern on the second detector array which is centered about detector 106. Under those circumstances, the radiation received by detector 106 will be substantially equal to the radiation received by detector 72 of the first array, the radiation received by detector 108 will be substantially equal to the radiation received by detector 74, the radiation received by detector 114 will be substantially equal to the radiation received by detector 76, the radiation received by detector 116 will be substantially equal to the radiation received by detector 78 and the radiation received by detector 118 will be substantially equal to the radiation received by detector 80. There will, of course, be radiation received by detectors 110 and 112 of the second detector array but there will be no output from the first detector array corresponding to these locations since that radiation pattern falls in the space between detector 74 and detector 76. Likewise, on the other side of detector 106 of the second array, the radiation falling on detector 104 will be substantially equal to the radiation falling on detector 70 of the first array, the radiation falling on detector 98 of the second array will be substantially equal to the radiation falling on detector 68 of the first array, the radiation falling on detector 96 of the second array will be substantially equal to the radiation falling on detector 66 of the first array and the radiation falling on detector 94 of the second array will be substantially equal to the radiation falling on detector 64 of the first array. Here, again, radiation will, of course, fall on detectors 102 and 100 of the second array but there will be no corresponding detectors in the first array since that portion of the radiation pattern will fall between detector 68 and detector 70 of the first array.

In a manner to be described, the outputs of detectors 64, 66 and 68 are combined, while the outputs of detectors 70, 72, and 74 are combined and the outputs of detectors 76, 78 and 80 are combined, so as to produce three outputs from these groups of detectors of sufficient magnitude for them to be able to be handled by the signal processing circuitry. Likewise, the outputs of groups of three detectors in the second arrays are combined so as to produce sufficiently large signals to be processed satisfactorily but the groupings of the three combined detectors of the second array is changed from time to time so as to locate the position of best correspondence. In the example above, the output of detectors 94, 96 and 98 of the second array would be combined and compared with the output of detectors 64, 66 and 68 of the first array and the output of detectors 104, 106 and 108 of the second array would be combined and compared with the combined output of detectors 70, 72 and 74 of the first array and the output of detectors 114, 116 and 118 of the second array would be combined and compared with combined output of detectors 76, 78 and 80 of the first array. As a result of this comparison, a first signal indicative of the closeness of correlation would be provided. Subsequently, the outputs of detectors 92, 94 and 96 of the second array would be combined and compared with the outputs of detectors 64, 66 and 68 of the first array, while the output of detectors 102, 104 and 106 of the second array would be combined and compared with the output of detectors 70, 72 and 74 of the first array, while the output of detectors 112, 114 and 116 of the second array would be combined and compared with the output of detectors 76, 78 and 80 of the first array. A second signal indicative of the closeness of correlation would then be provided. Finally, the outputs of detectors 90, 92 and 94 of the second array might then be combined and compared with the output of detectors 64, 66 and 68 of the first array, while the output of detectors 100, 102 and 104 of the second array would be combined and compared with the output of detectors 70, 72 and 74 of the first array, while the output of detectors 110, 112 and 114 of the second array would be combined and compared with the output of detectors 76, 78 and 80 of the first array. A third signal indicative of the closeness of correlation would be provided and the first, second and third signals compared to find the best correlation which in the present example would be the first signal indicating the object was in the near zone. This is true because with an objected located in the example at position Q3 in the near zone. the radiation falling on detectors 94, 96 and 98 is substantially equal to the radiation falling on detectors 64, 66 and 68 so that the combined outputs of these groups of detectors would be substantially equal. Likewise, the radiation falling on detectors 104, 106 and 108 is substantially equal to the radiation falling on detectors 70, 72 and 74 so that the outputs of these groups of detectors is also substantially equal. In similar fashion, the radiation falling on detectors 114, 116 and 118 is substantially equal to the radiation falling on detectors 76, 78 and 80 so that the output of these groups of detectors is also substantially equal. On the other hand, when an object is located at Q3, the outputs of detectors 90, 92 and 94, when combined, or the outputs of detectors 92, 94 and 96 when combined, would not be equal to the outputs from detectors 64, 66 and 68 nor would the outputs of detectors 100, 102, and 104, when combined, or the outputs of detectors 102, 104 and 106, when combined, be equal to the outputs of detectors 70, 72 and 74, and the output of detectors 110, 112 and 114, when combined, or the output of detectors 112, 114 and 116, when combined, would fail to equal the output of detectors 76, 78 and 80. Thus, by comparing various groups of three detectors in the second detector array with the groups of three detectors in the first detector array, a determination of the position of the object may be obtained.

If an object is located at position Q2, the radiation intensity distribution would be centered around detector 104 of the second detector array and the sum of the detector outputs 102, 104 and 106, would be substantially equal to the sum of the outputs of detectors 70, 72 and 74. When an object was located at position Q1, the radiation distribution would be centered around detector 102 of the second array and the combined outputs of detectors 100, 102 and 104 would be substantially equal to the combined outputs of detectors 70, 72 and 74. If objects are located between positions Q1 and Q2, or between Q2 and Q3, then the position of closest correspondence will provide an indication of the zone which is formed by these positions in a manner similar to that described above.

Thus, it is seen that by properly arranging the smaller detectors of the first and second arrays and by combining the outputs in a predetermined fashion, the zones involved become narrower for greater accuracy, while the magnitudes of the signals from the smaller detectors is still sufficiently large to provide for adequate handling by the signal processing circuitry. Of course, it is clear that greater or fewer zones may be used by altering the numbers of detectors in the two arrays and that more or less than three detector outputs may be combined to produce a desired resultant magnitude for the signal to the processing circuitry.

Figure 3:
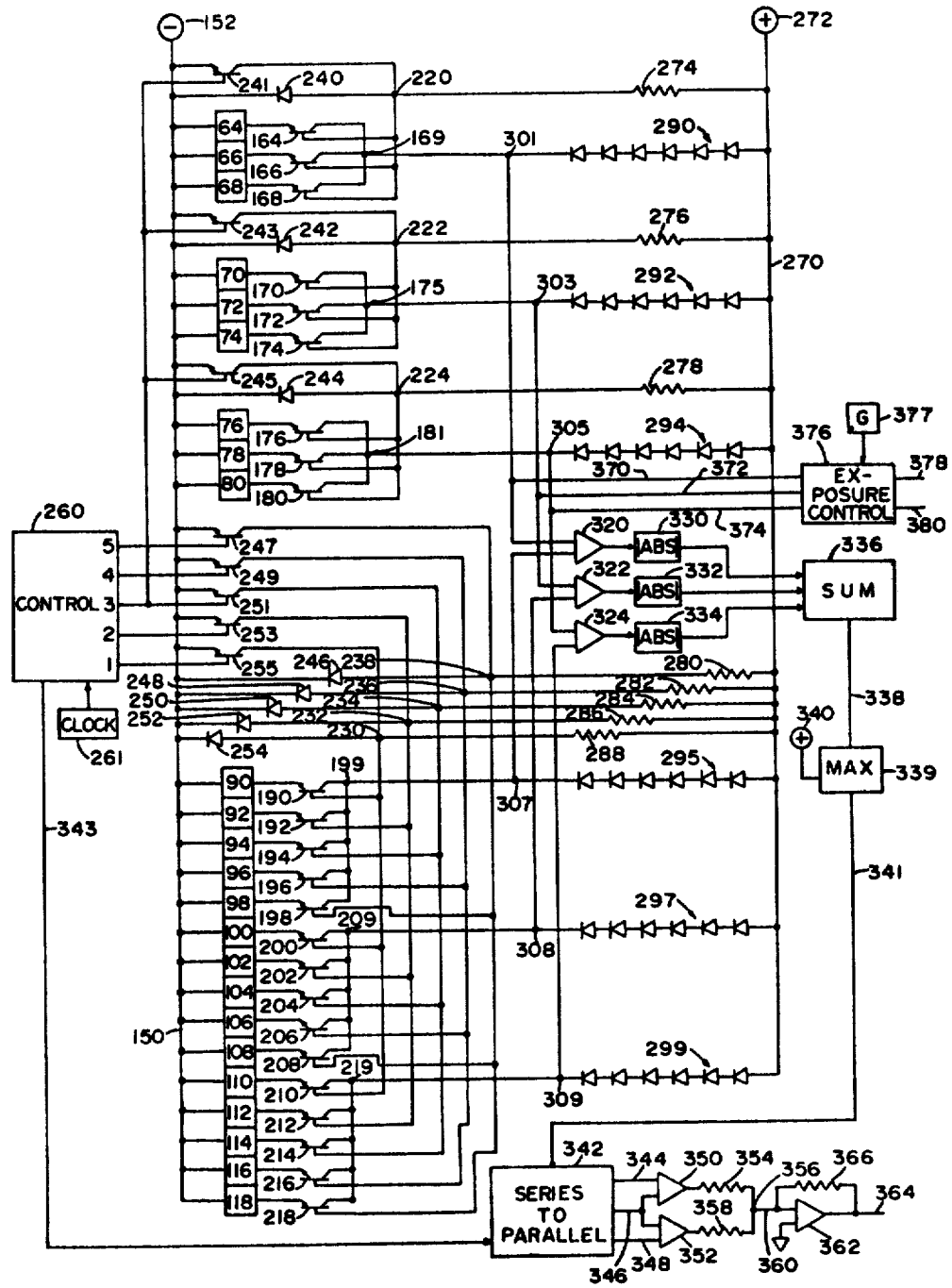
FIG. 3 shows a schematic diagram of one embodiment of the signal processing circuitry of the present invention.

In FIG. 3, a circuit is shown which will operate to produce the comparisons between the various sets of detectors of the second array with the detectors of the first array as described in connection with FIG. 2. In FIG. 3, the detectors 64-80 of the first array and the detectors 90-118 of the second array are shown vertically arranged and the left side of each of the detectors is shown connected to a bus 150 which, in turn, is connected to a source of negative potential as at terminal 152. The right side of each detector is connected to an emitter electrode of one of a plurality of NPN transistors which have their collector electrodes connected together in various groupings as follows: Detectors 64, 66 and 68 in the upper grouping of the first detector array are connected to the emitter electrodes of transistors 164, 166 and 168, respectively, all of which have their collector electrodes connected together at junction point 169; detectors 70, 72 and 74 in the middle grouping of the first detector array are connected to the emitter electrodes of transistors 170, 172 and 174, respectively, all of which have their collector electrodes connected together at junction point 175; detectors 76, 78 and 80 in the lower grouping of the first detector array are connected to the emitter electrodes of transistors 176, 178 and 180, respectively, all of which have their collector electrodes connected together at junction point 181; detectors 90, 92, 94, 96 and 98 in the upper grouping of the second detector array are connected to the emitter electrodes of transistors 190, 192, 194, 196 and 198, respectively, all of which have their collector electrodes connected together at junction point 199; detectors 100, 102, 104, 106 and 108 of the middle grouping in the second detector array are connected to the emitter electrodes of transistors 200, 202, 204, 206 and 208, respectively, all of which have their collector electrodes connected together at junction point 209; and detectors 110, 112, 114, 116 and 118 in the lower grouping of the second detector array are connected to the emitter electrodes of transistor 210, 212, 214, 216 and 218, respectively, all of which have their collector electrodes connected together at junction point 219. The base electrodes of all of these transistors are also connected together in various groupings as follows: transistors 164, 166 and 168 have their base electrodes connected together at junction point 220; transistors 170, 172 and 174 have their base electrodes connected together at junction point 222; transistors 176, 178 and 180 have their base electrodes connected together at junction point 224; transistors 190, 200 and 210 have their base electrodes connected together to junction point 230; transistors 192, 202 and 212 have their base electrodes connected together at junction point 232; transistors 194, 204 and 214 have their base electrodes connected together at junction point 234; transistors 196, 206 and 216 have their base electrodes connected together at junction point 236; and transistors 198, 208 and 218 have their base electrodes connected together at junction point 238.

Junction point 220 is connected to the anode of a diode 240 and to the collector electrode of an NPN transistor 241; junction point 222 is connected to the anode of a diode 242 and to the collector electrode of an NPN transistor 243; junction point 244 is connected to the anode of a diode 244 and to the collector electrode of an NPN transistor 245; junction point 238 is connected to the anode of a diode 246 and to the collector electrode of an NPN transistor 247; junction point 236 is connected to the anode of a diode 248 and to the collector electrode of an NPN transistor 249; junction point 234 is connected to the anode of a diode 250 and to the collector electrode of an NPN transistor 251; junction point 232 is connected to the anode of a diode 252 and to the collector electrode of an NPN transistor 253; and junction point 230 is connected to the anode of a diode 254 and to the collector electrode of an NPN transistor 255. The cathodes of diodes 240, 242, 244, 246, 248, 250, 252 and 254, as well as the emitter electrodes of transistors 241, 243, 245, 247, 249, 251, 253 and 255 are all connected together to the negative bus 150.

The base electrode of transistor 255 is shown connected to a first terminal of a control circuit 260, which is shown connected to a timing circuit or clock 261. The base terminal of transistor 253 is connected to a second input of control circuit 260; the base terminal of transistor 251 as well as the base terminals of transistors 241, 243 and 245 are connected together to a third input of the control circuit 260. The base terminal of transistor 249 is connected to a fourth terminal of control circuit 260 and the base terminal of transistor 247 is connected to a fifth terminal of control circuit 260. The purpose of control circuit 260 is to energize and de-energize various ones of the detectors in the detector arrays so as to produce the desired comparisons as will be further explained.

Shown in the right hand side of FIG. 3 is a second bus 270 which is connected to a source of positive potential as at terminal 272. Bus 270 is connected to junction point 220 through a resistor 274, to junction point 222 through a resistor 276, to junction point 224 through a resistor 278, to junction point 238 through a resistor 280, to junction point 236 through a resistor 282, to junction point 234 through a resistor 284, to junction point 232 through a resistor 286, and to junction point 230 through a resistor 288.

The combination of resistors 274, 276, 278, 280, 282, 284, 286 and 288 with diodes 240, 242, 244, 246, 248, 250, 252 and 254, respectively, form a voltage dividing circuit between buses 150 and 270 for purposes of providing a bias potential at junction points 220, 222, 224, 238, 236, 234, 232 and 230, respectively, for the bases of the transistors connected to these junction points.

Bus 270 is also connected to the anode of a chain of logging diodes formed in groups of six diodes each and identified by reference numerals 290, 292, 294, 295, 297 and 299, respectively. The cathode of logging diodes 290 is connected to a junction point 301, the cathode of logging diodes 292 is connected to a junction point 303, the cathode of logging diodes 294 is connected to a junction point 305, the cathode of logging diodes 295 is connected to a junction point 307, the cathode of logging diodes 297 is connected to a junction point 308, and the cathode of logging diodes 299 is connected to a junction point 309. Junction point 301 is connected to the junction point 169, junction point 303 is connected to junction point 175, junction point 305 is connected to junction point 181, junction point 307 is connected to junction point 199, junction point 308 is connected to junction point 209, and junction point 309 is connected to junction point 219. The purpose of logging diodes 290-299 is to provide signals at junction points 301-309, which represent the log of the signal coming from the various detectors so that when the signals are subtracted, as will be later described, the comparison will result in a ratio signal. This feature is desirable since a ratio comparison of detector outputs is relatively independent of the absolute intensity of the radiation falling upon them.

Junction point 301 is connected to one input of a difference amplifier 320, the other input of which is connected to junction point 307. Junction point 303 is connected to one input terminal of a difference amplifier 322, the other input terminal of which is connected to junction point 308. Junction point 305 is connected to one input terminal of a difference amplifier 324, the other input terminal of which is connected to junction point 309. The outputs of difference amplifiers 320, 322 and 324 may be negative, zero or positive, depending on the relative values of the signals at junction points 301, 303, 305 and 307, 308 and 309, respectively. These signals are presented to absolute value circuits 330, 332 and 334, respectively to produce output signals which are of the same polarity either negative or positive but for purposes of explanations will be assumed to be positive. The outputs of these absolute value circuits are presented to a summing circuit 336, which produces an output on a conductor 338 which may be either negative or positive but again will herein be assumed to be positive. The signal on conductor 338 is representative of the sum of the absolute value of the differences of the log signals presented to the difference amplifiers 320, 322 and 324 and is, as will be explained, indicative of the closeness of correlation between the radiation intensities received by the various sensors being compared.

The output of summing circuit 336 on conductor 338 is shown being presented to a maximizing circuit 339, which also receives an input from a source of reference potential 340. Maximizing circuit 339 produces an output on a conductor 341 which is presented to a series-to-parallel converter 342 which has a second input connected to an output of control circuit 260 by a conductor 343.

The purpose of maximizing circuit 339 is to convert the signal from summing circuit 336 which is near zero at the best correspondence condition to a signal which is maximum at the best correspondence position for ease of handling. This may be accomplished by subtracting the signals which appear on conductor 338 from the reference voltage coming from source 340. The use of a maximizing circuit is arbitrary, however, since the signals on conductor 338 which are minimum at best correspondence may be directly used to detect the correlation position. In other words whether to detect a maximum or a minimum is a matter of design choice.

Series-to-parallel converter 342 has three outputs appearing on conductors 344, 346 and 348, respectively. Conductor 344 is connected to one input terminal of an amplifier 350, the other input terminal of which is connected to conductor 346. Conductor 348 is connected to one input terminal of an amplifier 352, the other input terminal of which is also connected to conductor 346. The output of amplifier 350 is connected through a resistor 354 to a junction point 356 and the output of amplifier 352 is connected through a resistor 358 to junction point 356. Junction point 356 is connected by a conductor 360 to one input terminal of an amplifier 362, the other input of which is shown connected to signal ground. The output of amplifier 362 is presented on a conductor 364 and is connected by a resistor 366 back to the input of amplifier 362 to provide feedback. The purpose of a circuit including the series-to-parallel converter 340, amplifiers 350, 352 and 362, is to produce an output on conductor 364 indicative of which of the input signals is maximum and thus indicating in which of the three zones the object to be detected or photographed is located.

Since, as explained, the signal at junction points 301, 303 and 305 is indicative of the radiation falling on the three groups of detectors of the first array, the sum of these signals is indicative of the entire amount of radiation falling on the first array and, accordingly, may be used in connection with an optical device such as a camera as an indication of the light intensity available for film exposure. Accordingly, FIG. 3 shows conductors 370, 372 and 374 connected between the junction points 301, 303 and 305, respectively, and the input to an exposure control device 376. Exposure control device 376 has an input from a gain control device 377 which operates to provide an input which may be varied by the operator in accordance with film speed or ASA number. Exposure control device 376 may be a simple switching circuit which sums the signals on conductors 370, 372 and 374 and then adjusts this sum in accordance with the input from gain control device 377 to produce a pair of outputs on conductors 378 and 380, which may be used to control the camera aperture or the camera shutter to provide for proper exposure of the film as will be described in connection with FIG. 5.

OPERATION OF FIG. 3

Utilizing an input from clock 261, control circuit 260 operates to produce a "0" or a "1" signal on terminals 1, 2, 3, 4 and 5, in the following sequence: first, a "0" signal will appear on terminals 1, 2 and 3, while a "1" signal will appear on terminals 4 and 5; second, a "0" signal will appear on terminals 2, 3 and 4, while a "1" signal will appear on terminals 1 and 5; and third, a "0" signal will appear on terminals 3, 4 and 5, while a "1" signal appears on terminals 1 and 2. The purpose of this is to keep transistors 241, 243 and 245 in an "OFF" or nonconducting state during all three of the above three sequential steps, while at the same time rotating a different combination of three transistors from the group 247–255 into an "OFF" or nonconducting state. For example, the first step in the sequence produces a "0" signal at terminals 1, 2 and 3, which has the effect of turning transistors 241, 243, 245, 251, 253 and 255 into an "OFF" or nonconducting state because of the "0" signal on terminals 1, 2 and 3 of control device 260, while the "1" signal appearing on terminals 4 and 5 turns transistors 247 and 249 into an "ON" or conducting state. The second step of the sequence will produce a "0" at terminals 2, 3 and 4, which will have the effect of turning transistors 241, 243, 245, 249, 251 and 253 into an "OFF" state, while the "1" signal appearing on terminals 1 and 5 will cause transistors 247 and 255 to be "ON". The third step of the sequence will produce a "0" signal at terminals 3, 4 and 5, which will have the effect of turning transistors 241, 243, 245, 247, 249 and 251 into an "OFF" state, while the "1" signal at terminals 1 and 2 of control circuit 260 will cause transistors 253 and 255 to be in an "ON" state. Whenever any of the transistors 241, 243, 245, 247, 249, 251, 253 or 255 is in an "ON" state, the voltage appearing at the junction point 220, 222, 224, 238, 236, 234, 232 or 230 associated therewith will be substantially equal to the negative potential at terminal 152, while when any of these transistors is in an "OFF" state, the voltage at the junction points mentioned will rise towards the voltage of the positive potential at terminal 272 because of the bias circuits comprising resistors 274, 276, 278, 280, 282, 284, 286 and 288. Whenever there is a positive potential at any of the junction points 220, 222, 224, 238, 236, 234, 232 or 230, the bases of the transistors connected thereto will be biased such as to turn those transistors into an "ON" or conducting state. Thus, with a "0" on the terminal 3 of control circuit 260, which signal exists during all three of the steps of the sequence, transistors 241, 243 and 245 will be in an "OFF" condition, so that the potential at terminals 220, 222 and 224 becomes positive, thereby turning on all of the transistors 164–180. When transistors 164, 166 and 168 are in an "ON" condition, the signals generated by detectors 65, 66 and 68, which vary with the intensity of radiation falling thereon, are passed to junction point 169 and at junction 301, there appears on a signal of magnitude indicative of the log of the intensity of the sum of the radiation being received by detectors 64, 66 and 68. Likewise, when transistors 170, 172 and 174 are in an "ON" condition, the signals generated by detectors 70, 72 and 74 are passed to junction point 175, so that a signal appears on junction 303 indicative of the log of the sum of the radiation being received by detectors 70, 72 and 74. In similar fashion, when transistors 176, 178 and 180 are in an "ON" condition, the signal generated by detectors 76, 78 and 80 is passed to junction 181, so that a signal appears on junction 305 indicative of the log of the sum of the radiation being received by detectors 76, 78 and 80. Thus, during all three phases of the sequence from control circuit 260, there will appear on junction points 301, 303 and 305, signals indicative of the log of the sum of the radiation being received by the detectors 64–80.

During the first step of the sequence from control circuit 260 with a "0" appearing on terminals 1, 2 and 3, junction points 230, 232 and 234 will become positive, while junction points 236 and 238 will become negative due to the fact that there is a "1" signal on terminals 4 and 5 of the control circuit 260, which turns on transistors 247 and 249. With a positive signal at junction points 230, 232 and 234, transistors 190, 192, 194, 200, 202, 204, 210, 212 and 214 will be turned "ON", while transistors 196, 198, 206, 208, 216 and 218 will remain "OFF". Thus, in the first step of the sequence, the upper three detectors of each of the three groupings in the second array will have the signals generated thereby pass through their respective transistors to junction points 199, 209 and 219, respectively. Accordingly, there will be a signal on junction point 307, which is of magnitude indicative of the log of the sum of the radiation being received by detectors 90, 92 and 94, while the signal at junction point 308 will be indicative of the log of the sum of the radiation being received by detectors 100, 102 and 104 and the signal appearing on junction 309 will be indicative of the log of the sum of the radiation being received by detectors 110, 112 and 114.

Still during the first phase of the sequence from control circuit 260, the difference amplifier 320 will receive inputs from terminals 301 and 307, which, as mentioned, are indicative of the log of the sum of the radiation being received by detectors 64, 66 and 68 and detectors 90, 92 and 94, respectively. Thus, the output of the difference amplifier 320 will be a signal of magnitude indicative of the difference in the logs of the radiation being received by these two sets of detectors which, of course, is indicative of the ratio of these radiation distributions. This signal is presented to the absolute value circuit 330 to remove the effect of both positive and negative values at the output of difference amplifier 320 and the output produced by absolute value circuit 330 is presented to the summing circuit 336. In similar fashion, difference amplifier 322 is receiving inputs from junction points 303 and 308, which, as indicated above, is indicative of the log of the sum of the radiation being received by detectors 70, 72 and 74, and detectors 100, 102 and 104, respectively. Thus, the output of amplifier 322 will be a signal indicative of the difference of these two logs, or the ratio of the sums, and this output is presented to absolute value circuit 332, the output of which is also presented to the summing circuit 336 and is indicative of the ratio of the intensity of radiation being received by detectors 70, 72 and 74 and detectors 100, 102 and 104. In similar fashion, the inputs to difference amplifier 324 are from junction points 305 and 309, respectively, and again the output of the difference amplifier 324 will be the difference in the logs of the radiation signals at junction points 305 and 309, respectively, which signal is presented to the absolute value circuit 334, so that its output which is presented to the summing circuit 336 is indicative of the ratio of the intensity of radiation being received by detectors 76, 78 and 80 and detectors 110, 112 and 114, respectively. It should be noted that if an object were located at position Q1 in FIG. 2 so that the intensity of radiation was centered about detector 102 in the second detector array, then the radiation distributions being received by detectors 64, 66 and 68 would be substantially equal to the radiation being received by detectors 90, 92 and 94, while the radiation being received by detectors 70, 72 and 74 would be substantially equal to the radiation being received by detectors 100, 102 and 104, and the radiation being received by detectors 76, 78 and 80 would be substantially equal to the radiation being received by detectors 110, 112 and 114. Since these are the signals being compared in the first step of the above described sequence, the output of amplifiers 320, 322 and 324 would be near zero and the outputs of the absolute value circuits would be near zero at a minimum condition. On the other hand, if the object to be focused upon were located at position Q2, then the radiation being received by the detectors which are being compared in step 1 of the sequence from control circuit 260, would not be equal and the outputs from absolute value circuits 330, 332 and 334 would be greater than the minimum value.

Summing circuit 336 receives the signals from absolute value circuits 330, 332 and 334 and produces an output on conductor 338 of a magnitude indicative of the sum of these three signals and its output also will be near zero or at a minimum condition when the inputs to difference amplifiers 320, 322 and 324 are closest to being equal.

During the second step of the sequence, clock 261 produces a signal which causes a change at the outputs of control circuit 260, so that terminals 2, 3 and 4 will have a "0" signal thereon and terminals 1 and 5 will have a "1" signal thereon. This causes transistors 241, 243, 245, 249, 251 and 253 to be in an "OFF" condition, while transistors 247 and 255 are in an "ON" condition. Since transistors 241, 243 and 245 remain off, the signals which appear at junction points 301, 303 and 305 will not change but different signals will now appear on junction points 307, 308 and 309. With transistors 249, 251 and 253 in an "OFF" condition due to the "0" signal on terminals 2, 3 and 4 of control circuit 260, the voltages at junction points 232, 234 and 236 will be positive while with transistors 255 and 247 in an "ON" condition due to the "1" signal on terminals 1 and 5 of control circuit 260, junction points 230 and 238 will be negative. With junction points 232, 234 and 236 positive, transistors 192, 194, 196, 202, 204, 206, 212, 214 and 216 will be turned "ON", while transistors 190, 198, 200, 208, 210 and 218 will be turned "OFF". Thus, there will appear at junction point 307, a signal indicative of the log of the sum of the radiation being received by detectors 92, 94 and 96, the signal at junction point 308 will be indicative of the log of the sum of the radiation being received by detectors 102, 104 and 106, and the signal at junction point 309 will be indicative of the log of the sum of the radiation being received by detectors 112, 114 and 116. The signal at junction point 307 is again compared with the signal at junction point 301 by difference amplifier 320, the signal at junction point 308 is again compared with the signal at junction point 303 by difference amplifier 322, and the signal at junction point 309 is again compared with the signal at junction point 305 by difference amplifier 324, so that the outputs of the absolute value circuits 330, 332 and 334 presented to summing circuit 336 will be indicative of the ratio of the sum of the radiation being received by detectors 64, 66 and 68 and detectors 92, 94 and 96, and the ratio of the radiation being received by detectors 70, 72 and 74 and detectors 102, 104 and 106, and the ratio of the radiation being received by detectors 76, 78 and 80 and detectors 112, 114 and 116, respectively. If the object were located near position Q2 in FIG. 2, then the signal appearing at output 338 of summing circuit 336 would be zero or at a minimum value but if the object were located at a position closer to Q1 or Q3 then the signal on conductor 338 would be higher than the minimum.

In the third step of the sequence, clock 261 produces another signal which again changes the output signals from control circuit 260 so that now a "0" signal appears at terminals 3, 4 and 5, and a "1" signal appears at terminals 1 and 2. As with the previous two steps of the sequence, all of the transistors associated with the detectors 64–80 will be turned "ON" so that the signals at junction points 301, 303 and 305, indicative of the log of the intensity of radiation being received by the three groups of detectors will not change. With respect to the second detector array, however, transistors 247, 249 and 251 are now in an "OFF" condition, while transistors 253 and 255 are in an "ON" condition. Thus, the potential at junction points 234, 236 and 238 will be positive, while the potential at junction points 230 and 232 will be negative. Under these circumstances, transistors 194, 196, 198, 204, 206, 208, 214, 216 and 218, will be turned on, while transistors 190, 192, 200, 202, 210 and 212, will be turned off. The signal then at junction point 307 will be indicative of the log of the sum of the radiation being received by detectors 94, 96 and 98, while the signal at junction point 308 will be indicative of the log of the sum of the radiation being received by detectors 104, 106 and 108 and the signal at junction point 309 will be indicative of the log of the radiation being received by detectors 114, 116 and 118, respectively. As with steps one and two of the sequence of control circuit 260, the signal appearing at junction point 301 is compared with the signal appearing at junction point 307 by difference amplifier 320, the signal appearing at junction point 303 is compared with the signal appearing at junction point 308 by difference amplifier 322, and the signal at junction point 305 is compared with the signal appearing at junction point 309 by difference amplifier 324, respectively. The output of amplifiers 320, 322 and 324, again present the difference of these signals to the absolute value circuit 330, 332 and 334, so that the input to the sum circuit 336 is a set of signals each indicative of the ratio of the sum of the radiation being received by one of the three groups of detectors in the first array and one of the bottom three groups of detectors in the second array. If the object were located near position Q3 in FIG. 2, then the signal at the input to sum circuit 336 would be minimum at this third step of the sequence but if the object were located closer to positions Q1 or Q2, then the input to summing circuit 336 would be greater than the minimum value.

Summing circuit 336 sums the three inputs from absolute value circuits 330, 332 and 334 and produces on conductor 338 three signals which appear in series, the first being indicative of the comparison that is made during the first step of the sequence, the second being indicative of the comparison that is made during the second step of the sequence, and the third being indicative of the comparison that is made during the third step of the sequence. Since the summing circuit output will be minimum at the best correlation position and since it may be easier or more convenient to detect a maximum signal, the signal on conductor 338 is shown connected to the maximizing circuit 339 so that the signal on conductor 341 will peak at a maximum when best correspondence between the radiation intensities falling on the compared groups of detectors is reached. For example, if a subject were located at infinity, that is, beyond point Q1 in FIG. 2, the signal on conductor 341 would be highest during the first step of the sequence, since the subject is closest to Q1. The signal on conductor 341 would be next highest during the second step of the sequence, since point Q2 is the next closest to the subject and the signal on conductor 341 would be lowest during the third step of the sequence since point Q3 is furthest from the subject position. As the subject moves close to the detectors and approaches point Q1, the signal on conductor 341 would increase for all three of the steps of the sequence and would reach a maximum in the first step of the sequence when the subject reached point Q1. Thereafter, as the subject moves from point Q1 to point Q2, the magnitude of the signal that appears on conductor 341 during the first step of the sequence will begin to decrease, while the magnitude of the signal appearing on line 341 during the second step of the sequence will continue to increase. At a point about midway between points Q1 and Q2, the magnitude of the voltage on conductor 341 will be about the same during the first and second steps of the sequence but will be lower during the third step of the sequence. Thus, from infinity to a point about half way between points Q1 and Q2 in FIG. 2, which has been identified as the far zone, the voltage on conductor 341 will be largest in the first step of the sequence, second largest during the second step of the sequence and smallest during the third step of the sequence. As the subject moves from about midway between points Q1 and Q2 to point Q2, the magnitude of the signal on conductor 341 during the first step of the sequence continues to decrease, while the magnitude of the signal on conductor 341 during the second step of the sequence continues to increase as does the magnitude of the signal on conductor 341 during the third step of the sequence. When the subject reaches point Q2, then the magnitude of the signal on conductor 341 during the first and third steps of the sequence will be about equal while the magnitude of the signal on conductor 341 during the second step of the sequence will be maximum. As the subject begins moving from point Q2 towards point Q3, the magnitude of the signal during the first step of the sequence continues to decrease, the magnitude of the signal during the second step of the sequence begins to decrease and the magnitude of the signal during the third step of the sequence continues to increase until a point is reached about midway between points Q2 and Q3, at which point the magnitude of the signal during the second and third steps of the sequence are about equal and the magnitude of the signal during the first step is now lowest. Thus, during the period the subject was about half way between points Q1 and Q2 and about half way between points Q2 and Q3, which has been identified as the middle zone, the magnitude of the signal on conductor 341 during the second step of the sequence is largest while the magnitude of the signal will be smaller for the first step and the third step.

As the subject moves from a point about midway between positions Q2 and Q3 in FIG. 2, towards point Q3, the magnitude of the signal on conductor 341 during the first step will continue to decrease, the magnitude of the signal on conductor 341 during the second step of the sequence will also continue to decrease while the magnitude of the signal on conductor 341 during the third step of the sequence will continue to increase until the subject arrives at point Q3, at which position the magnitude of the signal on conductor 341 during the third step is at a maximum with the magnitude of the signal during the second step smaller and the magnitude of the signal during the first step being the smallest. Thereafter, as the subject moves from point Q3 towards the detector arrays, the magnitude of the signals on conductor 341 during the first, second and third step, continue to decrease with the magnitude of the signal during the third step being highest, the magnitude of the signal during the second step being middle and the magnitude of the signal during the first step being lowest. Thus, from a point about midway between points Q2 and Q3 and a point between Q3 and the detector array, which has been identified as the near zone, the magnitude of the signal on conductor 341 is highest during the third step of the sequence.

There are thus three conditions which may exist with respect to the comparisons of the magnitude of the signals on conductor 341. The first condition is when the subject is in the far zone in which case the magnitude of the signal during the first step is always greater than the signal during the second step, while the magnitude of the signal during the second step is greater than the magnitude of the signal during the third step; the second condition being when the subject is in the middle zone in which case the magnitude of the signal during the second step is always greater than the magnitude of the signal during the first or third steps but the relative magnitude of the signal between the first and third steps varies with the position of the subject about point Q2 in FIG. 2; and the third condition being when the subject is in the near zone in which case the magnitude of the signal during the third step is always greater than the magnitude of the signal during the second step which, in turn, is always greater than the magnitude of the signal during the first step.

As seen in FIG. 3, the signals which exist on conductor 341 are presented to the series-to-parallel converter 342 which also receives an input on conductor 343 from the control circuitry 260. The purpose of the series-to-parallel converter 342 is to provide a signal on conductors 344, 346 and 348 simultaneously, which signals are representative of the signals existing on conductor 341 during the first, second and third steps, respectively. Thus, the signal on conductor 344 will be of magnitude indicative of the magnitude of the signal appearing on conductor 341 during the first step of the sequence, the magnitude of the signal on conductor 346 will be indicative of the magnitude of the signal appearing on conductor 341 during the second step of the sequence and the magnitude of the signal on conductor 348 will be indicative of the magnitude of the signal appearing on conductor 341 during the third step of the sequence.

Amplifier 350 produces a positive output signal whenever the magnitude of the signal on conductor 344 is greater than the magnitude of the signal on conductor 346 and produces a zero output signal whenever the magnitude of the signal on conductor 344 is less than the magnitude of the signal on conductor 346. Amplifier 352 produces a negative output signal whenever the magnitude of the signal on conductor 348 is greater than the magnitude of the signal on conductor 346 and produces a zero output whenever the magnitude of the signal on conductor 348 is less than the magnitude of the signal on conductor 346. Thus, if the subject were in the far zone, where the magnitude of the signal on conductor 344 is always greater than the magnitude of the signal on conductor 346 and the magnitude of the signal on conductor 346 is greater than the magnitude of the signal on conductor 348, then amplifier 350 would produce a positive output and amplifier 352 would produce a zero output. The positive output from amplifier 350 is presented through resistor 354 to junction point 356 and forms the input to amplifier 362. Amplifier 362 then produces a hard positive signal on conductor 364 indicative of the fact that the best correlation position is in the far zone. If the subject were in the middle zone where the magnitude of the signal on conductor 346 is always larger than the magnitude of the signal on either conductors 344 or 348, then both amplifiers 350 and 352 would produce a zero output signal so that the input to amplifier 362 would also be zero and the output appearing on conductor 364 would be zero. If the subject were in the near zone where the signal on conductor 348 is larger than the signal on conductor 346 and the signal on conductor 346 is larger than than the signal on conductor 344, amplifier 350 would produce a zero output signal while amplifier 352 would produce a negative output signal which signal would be presented through resistor 358 to junction point 356 so that the input to amplifier 362 would be negative thus producing a hard negative output signal on conductor 364.

It is thus seen that the signal appearing on conductor 364 will be positive whenever the subject is in the far zone, will be zero whenever the subject is in the middle zone and will be negative whenever the subject is in the near zone.

Figure 4:
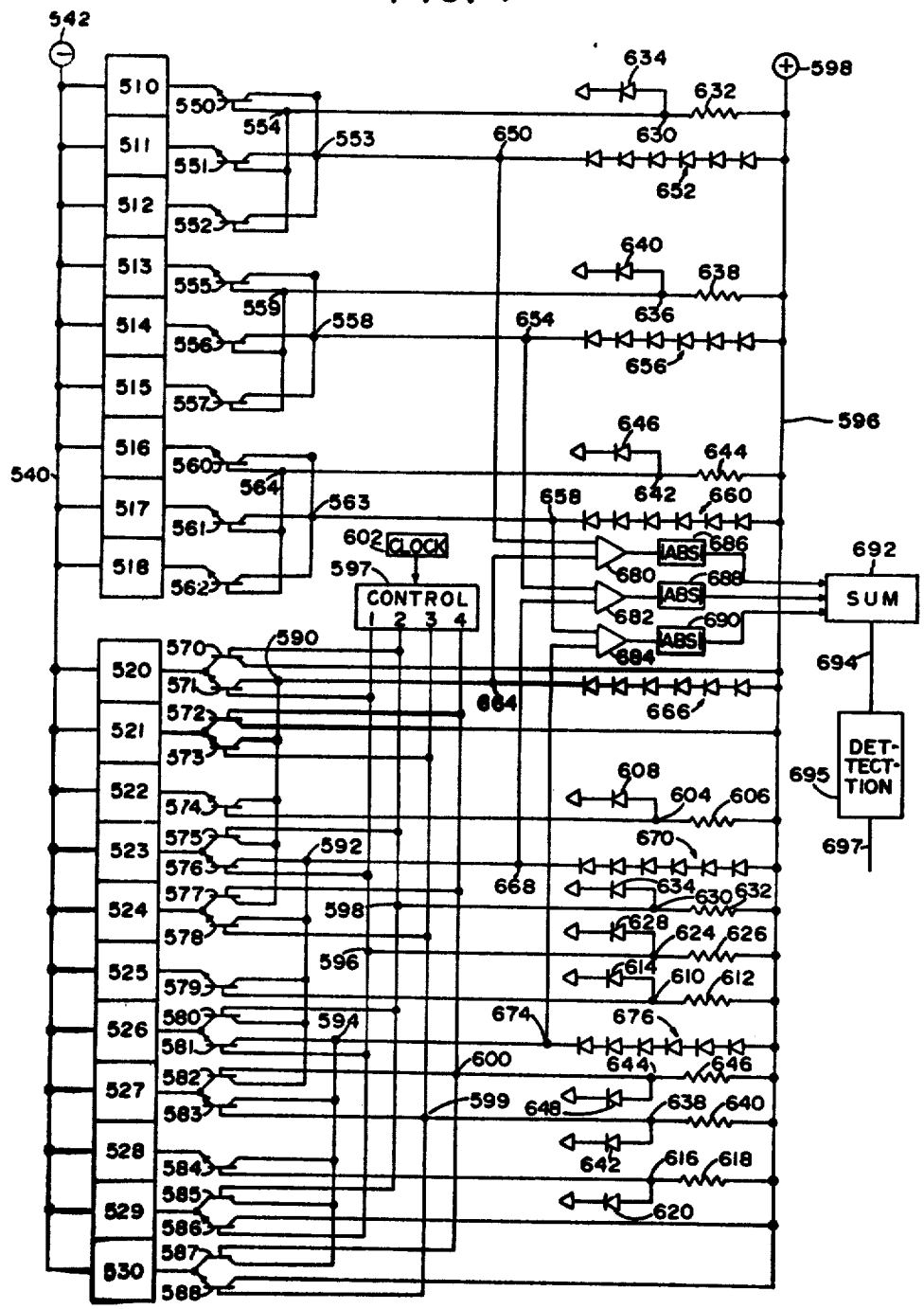
FIG. 4 shows a schematic diagram of an alternate embodiment of the signal processing circuitry of the present invention.

FIG. 4 shows an alternate embodiment for the detector arrays and for the electronic circuitry of the present invention. The apparatus of FIG. 4 utilizes four fewer detectors in the second array than were used in the apparatus of FIG. 3. This is accomplished by causing several of the detectors to be used in more than one summing circuit. By reducing the number of detectors utilized, further conservation of space is accomplished which may be of considerable advantage in the construction of miniaturized circuits for small camera modules.

In FIG. 4, the nine detectors of the first detector array have been numbered with reference numerals 510 through 518, respectively, and the 11 detectors of the second array have been identified by reference numerals 520 through 530, respectively. It should be noted that the second detector array contains two more detectors than the first detector array which is the minimum extra needed for a three zone system. If a two zone system were desired, then it would only be necessary to have one more detector in the second array, while if a four zone system were desired, it would be necessary to have three more detectors in the second array. It is seen that for each additional zone desired, one more detector would be added to the second array. In the present case, the outputs of detectors 510, 511 and 512 will be compared first with the outputs of detectors 520, 521 and 522 then with the outputs of 521, 522 and 523 and, finally, with the outputs of 522, 523 and 524. At the same time, the outputs of detectors 513, 514 and 515 of the first array will be compared first with the outputs of detectors 523, 524 and 525 in the second detector array, then with the outputs of detectors 524, 525 and 526 and, finally, with the outputs of detectors 525, 526 and 527. Finally, the outputs of detectors 516, 517 and 518 of the first array will be compared first with the outputs of detectors 526, 527 and 528 and then with the outputs of detectors 527, 528 and 529 and finally with the outputs of detectors 528, 529 and 530. Thus, each set of three detectors in the first array is compared with three sets of three detectors in the second array, the first set representing the far zone, the second set representing the middle zone, and the third set representing the near zone.

In FIG. 4 as in FIG. 3, the detectors are connected together in groups of three so as to increase the size of the signal produced by the individual small detectors. It should be understood, of course, that by increasing the size of the individual detectors, it would be possible to connect two of them together to produce a resultant signal of a size sufficient to be handled or, alternately, the size of the individual detectors could be reduced and four or more outputs combined to provide sufficient resultant signal size. In these cases, a smaller or larger number of detectors would be required, respectively, although the total area of detecting surface involved would remain substantially the same for the same size resultant signal.

As was the case in FIG. 3, the left hand sides of each of the detectors of FIG. 4 is connected to a bus 540 which, in turn, is connected to a negative potential such as at 542. In the first detector array, the right hand side of each of the detectors is connected to the emitter electrodes of a plurality of transistors in the following manner: detectors 510, 511 and 512 are connected to the emitter electrodes of NPN transistors 550, 551 and 552, respectively, all of which have their collector electrodes connected together to a junction point 553 and have their base electrodes connected together at a junction point 554; detectors 513, 514 and 515 are connected to the emitter electrode of transistors 555, 556 and 557, respectively, all of which have their collector electrodes connected together at a junction point 558 and have their base electrodes connected together at a junction point 559; detectors 516, 517 and 518 are connected to the emitter electrodes of NPN transistors 560, 561 and 562, respectively, all of which have their collector electrodes connected together at a junction point 563 and have their base electrodes connected together at a junction point 564. In the second detector array, the right hand side of each of the detectors is connected to the emitter electrodes of a plurality of transistors in the following manner: detector 520 is connected to the emitter electrodes of NPN transistors 570 and 571; detector 521 is connected to the emitter electrodes of NPN transistors 572 and 573; detector 522 is connected to the emitter electrode of NPN transistor 574; detector 523 is connected to the emitter electrodes of NPN transistors 575 and 576; detector 524 is connected to the emitter electrodes of NPN transistors 577 and 578; detector 525 is connected to the emitter electrode of NPN transistor 579; detector 526 is connected to the emitter electrodes of NPN transistors 580 and 581; detector 527 is connected to the emitter electrodes of NPN transistors 582 and 583; detector 528 is connected to the emitter electrode of NPN transistor 584; detector 529 is connected to the emitter electrodes of NPN transistors 585 and 586; and detector 530 is connected to the emitter electrodes of NPN transistors 587 and 588. The collector electrodes of transistors 571, 573, 574, 575 and 577 are all connected together at a junction point 590. The collector electrodes of transistors 576, 578, 579, 580 and 582 are all connected together to a junction point 592. The collector electrodes of transistors 581, 583, 584, 585, and 587 are all connected together to a junction point 594. The collector electrodes of transistors 570, 572, 586 and 588 are all connected to a second bus 596, which in turn is connected to a source of positive potential such as at 598. The base electrodes of transistors 571, 576, 581 and 586 are all connected together to a junction point 596 which in turn is connected to a first terminal of a control device 597. The base electrodes of transistors 570, 575, 580 and 585 are all connected together to a junction point 598 which in turn is connected to a second terminal of the control device 597. The base electrodes of transistors 573, 578, 583 and 588 are all connected together to a junction point 599, which is in turn connected to a third terminal of the control device 597. The base electrodes of transistors 572, 577, 582 and 587 are all connected together to a junction point 600, which in turn is connected to a fourth terminal of the control device 597. A clock 602 is shown in FIG. 4 providing an input to the control device 597. The base electrode of transistor 574 is connected to a junction point 604 and a resistor 606 is connected between junction 604 and bus 596, while a diode 608 has its anode connected to junction 604 and its cathode to signal ground. The base electrode of transistor 579 is connected to a junction point 610 and a resistor 612 is connected between junction 610 and bus 596 while a diode 614 has its anode connected to junction 610 and its cathode to signal ground. The base electrode of transistor 584 is connected to a junction point 616 and a resistor 618 is connected between junction 616 and bus 596, while a diode 620 has its anode connected to junction 616 and its cathode to signal ground. Junction point 596, which is connected to the first terminal of control device 597, is also connected to a junction point 624 and a resistor 626 is connected between junction 624 and bus 596, while a diode 628 has its anode connected to junction 624 and its cathode to signal ground. Junction point 598, which is connected to the second terminal of control device 597, is also connected to a junction point 630 and a resistor 632 is connected between junction 630 and bus 596, while a diode 634 has its anode connected to junction 630 and its cathode to signal ground. Junction point 599, which is connected to the third terminal of control device 597, is also connected to a junction point 638 and a resistor 640 is connected between junction 638 and bus 596, while a diode 642 has its anode connected to junction 638 and its cathode to signal ground. Junction point 600, which is connected to the fourth terminal of control device 597, is also connected to a junction point 644 and a resistor 646 is connected between junction 644 and bus 596, while a diode 648 has its anode connected to junction 644 and its cathode to signal ground. In similar fashion, in the first detector array, junction point 554 is connected to a junction point 630 and a resistor 632 is connected between junction 630 and and bus 596, while a diode 634 has its anode connected to junction 630 and its cathode to signal ground. Junction point 559 is also connected to a junction point 636 and a resistor 638 is connected between junction 636 and bus 596, while a diode 640 has its anode connected to junction 636 and its cathode to signal ground. Junction point 564 is also connected to a junction point 642 and a resistor 644 is connected between junction 642 and bus 596, while a diode 646 has its anode connected to junction 642 and its cathode to signal ground.

The purpose of the resistor-diode combinations 606 and 608 through 644 and 646 is to provide a bias potential for the bases of the various transistors to which the junctions 604 through 642 are connected and the bias is of sufficient magnitude to turn the transistors to an "ON" or conducting state.

Junction point 553, which is connected to the collector electrodes of the first three detectors of the first array, is also connected to a junction point 650 and, as in FIG. 3, to the cathode of a set of logging diodes 652, the anode of which is connected to bus 596. Junction point 558, which is connected to the collector electrodes of the middle three detectors of the first array, is also connected to a junction point 654 and to the cathode of a set of logging diodes 656, the anode of which is connected to bus 596. Junction point 563, which is connected to the collector electrodes of the bottom three detectors of the first array, is also connected to a junction point 658 and to the cathode of a set of logging diodes 660, the anode of which is connected to bus 596. With respect to the second detector array, junction point 590, which is connected to the collector electrodes of transistors 571, 573, 574, 575 and 577, is also connected to a junction point 664 and to the cathode of a set of logging diodes 666, the anode of which is connected to bus 596. Junction point 592, which is connected to the collector electrodes of transistors 576, 578, 579, 580 and 582 is also connected to a junction point 668 and to the cathode of a set of logging diodes 670, the anode of which is connected to bus 596. Junction point 594, which is connected to the collector electrodes of transistors 581, 583, 584, 585 and 587, is also connected to a junction point 674 and to the cathode of a set of logging diodes 676, the anode of which is connected to bus 596.

As with FIG. 3, a set of difference amplifiers 680, 682 and 684, is shown in the middle right hand portion of FIG. 4. Difference amplifier 680 has a first input connected to junction point 650 and a second input connected to junction point 664 and produces an output which is connected to absolute value circuit 686. Difference amplifier 682 has a first input connected to junction point 654, a second input connected to junction point 668 and has an output which is connected to absolute value circuit 688. Difference amplifier 684 has a first input connected to junction point 658, a second input connected to junction point 674 and has an output which is connected to an absolute value circuit 690. The outputs of absolute value circuits 686, 688 and 690 are all shown connected to a summing circuit 692 having an output on a conductor 694. Summing circuit 692 and its output 694 may be the same as those shown in FIG. 3 as summing circuit 336 and 338. Output 694 is connected to detection circuitry 695 having an output on a conductor 697. Detection circuitry 695 may be similar to the maximum circuit 339, the series-to-parallel converter 342 and the amplifiers 350, 352 and 362 shown in FIG. 3 and the output on conductor 697 like that of the output on conductor 364 of FIG. 3 being indicative of the correct correlation signal. Likewise, an exposure control system, such as that shown in FIG. 3, may be employed by summing the signals on junction points 650, 654 and 658 and adjusting the resultant in accordance with film speed or ASA number. These elements have been excluded from FIG. 4 for purposes of simplifying the drawing.

OPERATION OF FIG. 4

In the operation of the circuit of FIG. 4, all of the transistors 500 - 562 connected to the detectors 510 - 518 of the first array are on during all three steps of each comparison cycle because the bases of these transistors are all connected to one of the junction points 630, 636 or 642 and are biased by the respective resistor-diode combination to a sufficiently high positive potential. Thus, during all three steps of the comparison cycle, the radiation being sensed by detectors 510, 511 and 512 will be summed at junction point 553 and by the action of log circuit 652, a signal indicative of the log of this sum will appear and junction points 650 and at the first input of difference amplifier 680. Likewise, the radiation being detected by detectors 513, 514 and 515 will be summed during all of the comparison steps at junction point 558 and by the action of log circuit 656 a signal indicative of the log of this sum will appear at junction point 654 and the first input to difference amplifier 682. In similar fashion during all three steps of the comparison cycle, the radiation being sensed by detectors 516, 517 and 518 will be summed at junction point 563 and by the action of log circuit 660, a signal indicative of the log of this sum will appear at junction point 658 and at the first input of difference amplifier 684.

In the second detector array, different detectors will be placed into and out of various circuits for comparison with the summed signals above described. It should be noted that three of the transistors associated with the lower detector array are continually in an "ON" condition during all steps of the comparison cycle. Transistor 574 associated with detector 522 has its base connected to junction point 604, which by virtue of the biasing action of resistor 606 and diode 608, continually leaves this transistor in an "ON" condition. Similarly, transistor 579 associated with detector 525 has its base connected to junction point 610 which is biased by resistors 612 and 614 to a potential sufficient to leave this transistor continually on and transistor 584 associated with detector 528 has its base connected to junction point 616 which is biased by resistor 618 and diode 620 to a potential sufficient to leave this transistor on. Accordingly, the radiation falling on detectors 522, 525 and 528 will be presented through the emitter collector path of transistors 574, 579 and 584, respectively, to junction points 590, 592 and 594, respectively, during all three steps of the comparison cycle. It should also be noted that transistors 570, 572, 586 and 588 have their collectors connected to bus 596 and, accordingly, although their bases may be biased to an "ON" condition, the signal from detectors 520, 521, 529 and 530 through these transistors will have no effect.

The control circuit 597 has four output terminals upon which either a "0" or a "1" signal may appear. During step 1 of the comparison cycle, a "1" will appear on terminals 1 and 3, while a "0" will appear on terminals 2 and 4. Under these circumstances, transistors 571 and 573, which have their bases connected to terminals 1 and 3 of the control circuit 597, will be biased to an "ON" condition and the signal from detectors 520 and 521 will pass through the emitter collector path to junction point 590, where it will be summed with the signal from detector 522 passing through transistor 574. This signal by virtue of the log circuit 666 will appear at junction point 664 as a log of the sum of the radiation falling on these detectors and will be presented at the second input of summing amplifier 680. In similar fasion, during step one of the cycle, the bases of transistors 576 and 578 being connected to the output terminals 1 and 3 of the control circuit 597 will be biased to an "ON" condition so that the signals from detectors 523 and 524 will pass through the emitter collector path of transistors 576 and 578 to junction point 592 where they will be summed with the signal from detector 525 passing through transistor 579. By virtue of logging circuit 670, this signal will appear at junction point 668 as a log of the sum and will be presented to the second input of difference amplifier 682. Also, in similar fashion, transistors 581 and 583 having their bases connected to terminals 1 and 3 of control circuit 597 will be in an "ON" condition so that the signal from detectors 526 and 527 will pass through these transistors to junction point 594 to be summed with the signal from detector 528 passing through transistor 584. By virtue of the logging circuit 676, a signal indicative of the log of the sum of the radiation falling on detectors 526, 527 and 528 will appear at junction point 674 and to the second input of difference amplifier 684. All of the other transistors associated with the second array of detectors, i.e., 570, 572, 575, 577, 580, 582, 585 and 587, will be biased to an "OFF" condition by virtue of their bases being connected to either terminal 2 or 4 of the control circuit 597 except that, as mentioned, transistors 586 and 588 which have their bases connected to terminals 1 and 3 of the control circuit 597 so that they are in an "ON" condition, have their collectors connected to bus 596 so that the output of detectors 529 and 530 through these paths has no effect.

Accordingly, during step 1, signals indicative of the log of the radiation received by the various combinations of detectors is presented to difference amplifiers 680, 682 and 684, whose outputs are connected to absolute value circuits 686, 688 and 690 so that summing circuit 692 receives three inputs indicative of the absolute difference in the log values of the signals at the difference amplifier inputs or, in other words, indicative of the ratio of the radiation intensities involved. A signal indicative of this sum is presented on conductor 694 to detection circuitry 695 to produce a resultant correlation signal on conductor 697.

During step 2 of the comparison cycle, clock 602 presents a signal to control circuit 597 and the signals at the output terminals thereof will change so that a "0" signal is present on terminals 1 and 4 and a "1" signal on terminals 2 and 3. Under these circumstances, transistors 570, 573, 575, 578, 580, 583, 585, and 588 will be biased to an "ON" condition by virtue of the fact that their bases are connected to either terminal 2 or 3 of the control circuit 597. As mentioned previously, transistors 574, 579 and 584 are "ON" during all steps of the cycle by virtue of having their bases connected to a biasing resistor and diode combination. Accordingly, signals from detectors 521, 522 and 523 will all be summed at junction point 590 and by action of the logging circuit 666. A signal indicative of the log of this sum will appear at terminal 664 and at the second input of difference amplifier 680 to be compared with the log of the signal from detectors 510, 511 and 512 appearing at junction point 650 during all steps of the cycle. In similar fashion, the signals from detectors 524, 525 and 526 will all be summed at junction point 592 and by the action of the logging circuit 670, a signal indicative of the log of this sum will appear at junction point 668 and at the second input of difference amplifier 682 to be compared with the log of the signal from detectors 513, 514 and 515 appearing at junction point 654 during all steps of the comparison cycle. Likewise, the signal from detectors 527, 528 and 529 will all be summed at junction point 594 and by the action of the logging circuit 676, a signal indicative of the log of this sum will appear at junction point 674 and at the second input terminal of difference amplifier 684 to be compared with the log of the signal from the radiation detectors 516, 517 and 518 at junction point 658. Again, while transistors 570 and 588 are in an "ON" condition by virtue of their bases being connected to terminals 2 and 3 of control circuit 597, their collector electrodes are connected to bus 596 and, accordingly, signals from detectors 520 and 530 through these transistors will have no effect. Thus, during step 2 of the comparison cycle, difference amplifiers 680, 682 and 684 receive signals indicative of the log of the radiation intensities received by the detector combinations to which they are attached and the output of absolute value circuits 686, 688, 690 which form the input of summing circuit 692 will be representative of the ratio of the radiation intensity on the various detector combinations involved. The output of summing circuit 692 is again presented on conductor 694 to detection circuitry 695 to produce a resultant correlation signal on conductor 697.

In step 3 of the operation of FIG. 4, clock 602 presents another signal to control circuit 597 and the signals on its output terminals change so that a "0" signal appears at terminals 1 and 3 and a "1" signal appears at terminals 2 and 4. Under these circumstances, transistors 570, 572, 575, 577, 580, 582, 585 and 587 will be biased to an "ON" condition by virtue of their bases being connected to either terminal 2 or 4 of control circuit 597. As mentioned previously, transistors 574, 579 and 584 are continuously in an "ON" condition during the comparison cycle and, accordingly, the signals from detectors 522, 523 and 524 will be summed at junction point 590 and by virtue of the action of logging circuit 666, a signal indicative of the log of this sum will appear at terminal 664 and at the second input of difference amplifier 680 to be compared with the log of the signal from detectors 510, 511 and 512 appearing at junction point 650. In similar fashion, the signals from detectors 525, 526 and 527 will be summed at junction point 592 and by virtue of the action of the logging circuit 670 a signal indicative of the log of this sum will appear at junction point 668 and at the second input terminal of difference amplifier 682 to be compared with the log of the signal from detectors 513, 514 and 515 appearing at junction point 654. In similar fashion, the signals from detectors 528, 529 and 530 will be summed at junction point 594 and by virtue of the action of log circuit 676, a signal indicative of the log of this sum will appear at junction point 674 and at the second input of difference amplifier 684, where it will be compared with the log of the signals from detectors 516, 517 and 518 appearing at junction point 658. As mentioned previously, although transistor 570 and 572 are biased to an "ON" condition by virtue of their bases being connected to terminals 2 and 4 of control circuit 597, their collectors are connected to the bus 596 and, accordingly, signals from detectors 520 and 521 through these transistors will have no effect. All of the other transistors, i.e., 571, 573, 576, 578, 581, 583, 586 and 588, are biased to an "OFF" condition by virtue of the fact that their bases are connected to terminals 1 and 3 of control circuit 597.

As was the case in FIG. 3, the difference amplifiers 680, 682 and 684 of FIG. 4 receive input signals indicative of the logs of the signals representing the magnitude of the radiation being received by the detectors which are compared in step 3 and, as before, the output of absolute value circuits 686, 688 and 690 to the input of summing circuit 692 will be representative of the ratio of the radiation intensities received. Also, as before, the output sum appearing on conductor 694 will be presented to detection circuitry 695 so that a correlation signal will appear on conductor 697.

As with FIG. 3, this correlation signal will have a positive, zero or negative value depending on whether the object is in the far, middle or near zone.

Figure 5:
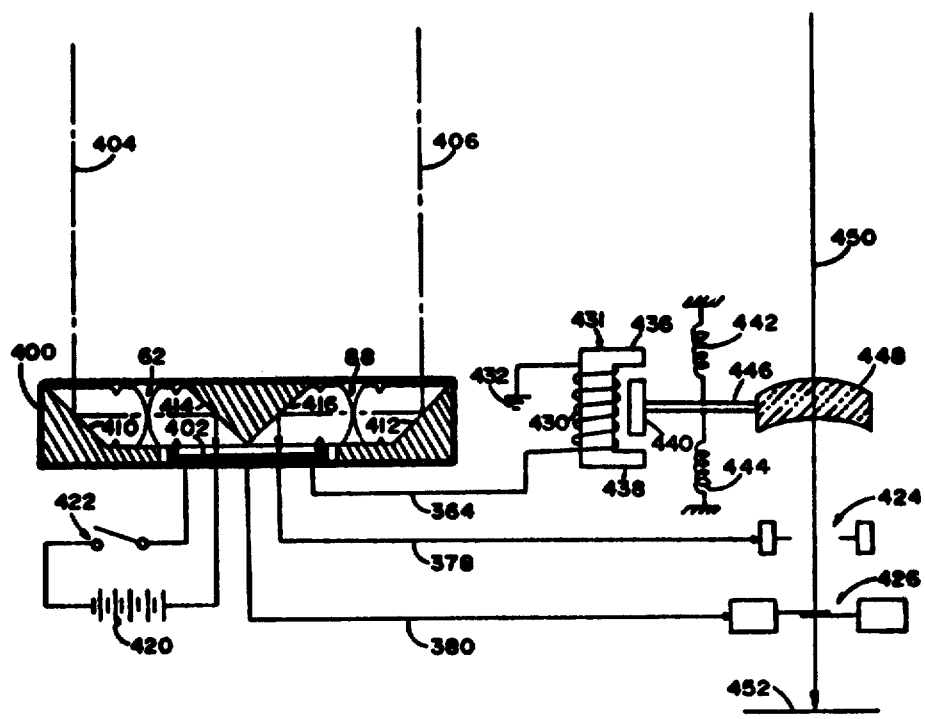
FIG. 5 shows one embodiment of the mechanical elements of an auto focus system of the present invention.

The signal on conductor 364 in FIG. 4 or its equivalent on conductor 697 in FIG. 4 may be used, for example, to control the position of the lens of a camera so as to cause automatic focusing thereof and one embodiment of a structure for such automatic focusing may be seen in FIG. 5.

In FIG. 5, a housing 400 is shown which may include the lenses 62 and 88 as described in connection with FIG. 2 and an integrated circuit block 402 containing the circuitry described in connection with either FIG. 3 or FIG. 4.

As seen in FIG. 5, light from the field of view enters the housing 400 along paths 404 and 406, which may correspond to the light paths of FIG. 2 identified by reference numerals 60 and 82, 84 or 86. Radiation from the scene travels through these two paths into the housing 400, where it is reflected off of surfaces 410 and 412, respectively, through lenses 62 and 88, respectively, is again reflected off of surfaces 414 and 416, respectively, onto the integrated circuit chip 402, where it will provide a radiation distribution upon the two detector arrays herein described. A power source in the form of a battery 420 is shown connected through a switch 422 to the integrated circuit chip to provide the supply power therein. Operation of the system may be initiated by the user by closing of switch 422. This switch may also be connected through a delay circuit to cause the opening of the shutter after focus has been achieved.

The outputs from the integrated circuit chip 402 are shown as three conductors 364, 378 and 380 which may correspond to the similar conductors of FIG. 3 or FIG. 4. Conductor 364 represents the conductor which provides a positive, zero or negative signal from the auto focus circuit, whereas conductor 378 represents the conductor from the exposure control system 376 of FIG. 3 to position the aperture of the camera and conductor 380 represents the conductor connected to the exposure control system 376 which provides for shutter control. Conductor 378 is shown in FIG. 5 as being connected to a variable aperture device 424 and conductor 380 is shown in FIG. 5 as being connected to a shutter mechanism identified by reference numeral 426. The aperture and shutter mechanism are of conventional design and no further description of them will be included herein.

Conductor 364, which will have a positive signal thereon whenever the subject is in the far zone, a zero signal thereon whenever the subject is in the middle zone, and a negative signal thereon whenever the subject is in the near zone is shown connected to one end of a winding 430 of an electromagnet 431, the other end of which is connected to ground as at 432. Electromagnet 431 has arms 436 and 438 which lie along either side of a magnetic element 440, which is carried by a pair of springs 442 and 444 connected to an arm 446, which is also connected to the taking lens 448 of the camera. It will be appreciated that whenever a positive signal appears on conductor 364, current will flow through the winding 430 in such a direction as to cause the magnetic element 440 to move in a downward direction against the action of springs 442 and 444. This will cause the lens 448 to move in a downward direction to a position which will provide a proper focus for a subject located in the far zone. On the other hand, if a negative signal occurs in line 364, the direction of current flow through the coil 430 will reverse, resulting in movement of magnetic element 440 in an upward direction, thereby causing lens 448 to move in an upward direction to provide proper focus for a subject located in the near zone. If there is a zero signal on conductor 364, then springs 442 and 444 will cause magnet 440 to assume a central location so that lens 448 is focused for objects located in the middle zone.

In FIG. 5, it is seen that radiation from the object in the field travels along a path 450 through lens 448, through aperture 424 and shutter 426 to the focal plane 452, where the film of the camera may be located. Thus, the apparatus described will cause lens 448 to move to one of three positions so as to provide a proper focus for subjects located in the field, whether they be in the far, middle or near zones.

The invention herein described may be used with still cameras or with motion picture or television cameras as well as with range finders or other apparatus where an indication of range to an object is useful. The actual detector size will depend upon the application and, for example, with a three zone system in a still camera, utilizing a 24 millimeter base and utilizing lenses of focal length of one centimeter, the width of each segment will be about 0.003 inches. If the focal length were increased to about 1.6 centimeters, the width of each segment will be 0.0045 inches. There will also be about a 0.0005 inch spacing between adjacent detector segments.

It is seen in FIGS. 3 and 4 that the transistors associated with the detectors of the upper array are in an "ON" or conducting state during all steps of the comparison sequence. In theory, it would be possible to remove the transistors and permanently connect the detector outputs in groups of three. It has been found in practice, however, that matching outputs from the first array with outputs from the second array is simplified if they are both connected in similar manner to similar apparatus. Thus, any fringe effects which might be introduced by the transistors of the second array will be compensated for by the transistors of the first array. Likewise, it has been noted that the transistors 570, 572, 586 and 588 of FIG. 4 have their collectors connected to the positive bus 596 so that any signals therethrough have no effect. These transistors might very well be eliminated entirely as was the case in FIG. 3 but as a refinement and in order to further match the actions of these transistors with the other transistors in both the lower and upper arrays, these transistors have been shown in FIG. 4 so that detectors 520, 521, 529 and 530 of the second array are connected to an "ON" transistor during all three steps of the comparison as are all of the other detectors in both arrays. For example, in the transition between step 1 where detector 529 is not being used to step 2 where it is included in the lower set of three detectors, there is a switching of transistor 585 from an "OFF" to an "ON" condition. If transistor 586 were not included and detector 529 had no current path in step 1, the transition to step 2 might provide an undesirable spike or surge in the signal being summed at junction point 594. Accordingly, transistors 570, 572, 586 and 588 are provided and arranged to be on whenever the other transistors connected to these detectors are off so that there will be a current path open from each detector during all of the steps of the comparison cycle.

It should be noted that the series-to-parallel converter 342 of FIG. 3 inherently contains a memory since it must store the signals on conductor 341 which occur during step 1 and step 2 of the comparison cycle, while step 3 is being completed, and so that the outputs on conductors 344, 346 and 348 representative of the values of these signals may appear simultaneously. Accordingly, a "hold" device may be connected in this circuit so as to freeze the output after it has been first obtained and to prevent change of focus thereafter even if the camera were moved. This feature is desirable when a photographer desires to first focus on a subject and then move the camera around so as to compose the picture in whatever manner he desired. A separate button or switch may be provided on the camera or the picture taking switch may be provided with two positions so that after focusing on the desired subject, the photographer would activate the switch to prevent further focus changes while he then composed his picture.

Many other changes and modifications of the present invention will become obvious to those skilled in the art. For example, it should be obvious that other control means may be used for causing the switching of transistors and the bringing of various detectors into and out of the circuits and, in view of the teachings of the present invention, modifications to the switching circuit so as to accommodate different numbers of detectors for different numbers of zones desired, may be made. PNP transistors may be substituted for the NPN transistors shown or other types of switching structures entirely may be employed. Other comparing means than the specific series-to-parallel converter and maximum amplitude determining circuit of FIG. 3 may be devised by those skilled in the art to determine the highest signal on conductor 341 or to determine the lowest signal on conductor 338. Furthermore, since it is not critical whether maximum or minimum signals are detected, circuitry to determine either or both extremum may be devised to provide correlation indication.

While the electronic circuitry has been disclosed herein as comparing the signals from the various groupings of detectors in series by a novel switching technique, the comparison could be performed in parallel so that the summed outputs of all three steps of the comparison would be obtained simultaneously although a greater number of electrical components would then be required.

Other lens control means than the electromagnet and centering spring combination of FIG. 4 may be used as might other arrangements for the housing 400 and the lenses and detection circuit board. Likewise, glow lamps or other indicators may be connected to the circuit to give a visual or audible indication of range and of focus achievement. Also, the pick off points for the exposure control circuitry may be from any convenient terminals, the signals on which vary with the intensity of radiation being received.

Accordingly, I do not wish to be limited by the specific descriptions used in connection with the preferred embodiment but intend rather to be limited only by the appended claims.

I claim:

1. Range sensing apparatus comprising in combination:
    first radiation sensing means operable to produce a first output signal of magnitude that varies with the quantity of radiation thereon, said first radiation sensing means positioned so as to receive radiation from a remote object along a first path;

second radiation sensing means comprising a plurality of radiation detectors each operable to produce an output signal of magnitude that varies with the quantity of radiation thereon, said second radiation sensing means positioned so as to receive radiation from the remote object along a second path when the object is at a first range and along a third path when the object is at a second range, correlation being indicated when the sum of the radiation falling upon a first and a second of the radiation detectors of said second radiation sensing means being approximately the same as the radiation falling on said first radiation sensing means showing that the object is proximate the first range and correlation being indicated when the sum of the radiation falling upon the second and a third of the radiation detectors of said second radiation sensing means being approximately the same as the radiation falling on said first radiation sensing means showing that the object is proximate the second range combining means operable in a first condition to connect the first and the second of the radiation detectors of said second sensing means to provide a first combined signal which varies with the sum of the output signals of the first and the second of the radiation detectors of said second sensing means and operable in a second condition to connect the second and the third of the radiation detectors of said second sensing means to provide a second combined signal which varies with the sum of the output signals of the second and the third of the radiation detectors of said second sensing means; and means connected to said first radiation sensing means and to said combining means to compare the first output signal with the first combined signal and to compare the first output signal with the second combined signal and producing a resultant signal indicative of which comparison provided the closest correlation.

2. Distance determining apparatus comprising in combination:

first and second detector arrays, each array comprising a plurality of radiation responsive detectors each of which produces an output indicative of the amount of radiation falling thereon, the first of said detector arrays mounted to receive radiation from a remote object along a first path so that the radiation from the object is distributed over the first array and illuminates a first, second, third and fourth of the detectors thereof, the second of said detector arrays mounted to receive radiation from the remote object along a second path so that the radiation from the object is distributed over the second array and illuminates a fifth, six, seventh and eighth of the detectors thereof when the object is at a first distance and illuminates the sixth, seventh, eighth and ninth of the detectors thereof when the object is at a second distance;

first means comparing the radiation received by the first and second of the detectors with the radiation received by the fifth and sixth of the detectors and producing a first resultant signal in accordance therewith;

second means comparing the radiation received by the third and fourth of the detectors with the radiation received by the seventh and eighth of the detectors and producing a second resultant signal in accordance therewith;

third means comparing the radiation received by the first and second of the detectors with the radiation received by the sixth and seventh of the detectors and producing a third resultant signal in accordance therewith;

fourth means comparing the radiation received by the third and fourth of the detectors with the radiation received by the eighth and ninth of the detectors and producing a fourth resultant signal in accordance therewith;

combining means connected to said first, second, third and fourth means, combining the first resultant signal with the second resultant signal to produce a first output signal and combining the third resultant signal with the fourth resultant signal to produce a second output signal; and comparing means connected to said combining means for determining the relative magnitude of the first and second output signals as an indication of the distance to the object.

3. Apparatus of the class described comprising, in combination:

a first array comprising a plurality of radiation responsive detectors, each detector of said first array having an output and operable to produce at the output a signal which is of magnitude indicative of the radiation received by the detectors;

a second array comprising a plurality of radiation responsive detectors, each detector of said second array having an output and operable to produce at the output a signal which is of magnitude indicative of the radiation received by the detectors;

means connecting the outputs of a first and second of the detectors in said first array to produce a first combined signal of magnitude which varies with the sum of the radiation on the first and the second of the detectors in the first array;

means connecting the outputs of a third and a fourth detectors in said first array to produce a second combined signal of magnitude which varies with the sum of the radiation on the third and the fourth of the detectors in the first array;

means connecting the outputs of a first and a second of the detectors in said second array to produce a third combined signal of magnitude which varies with the sum of the radiation on the first and the second of the detectors in the second array;

means connecting the outputs of the second and a third of the detectors in said second array to produce a fourth combined signal of magnitude which varies with the sum of the radiation on the second and the third of the detectors in the second array;

means connecting the outputs of a fourth and a fifth of the detectors in said second array to produce a fifth combined signal of magnitude which varies with the sum of the radiation on the fourth and the fifth of the detectors in the second array;

means connecting the outputs of the fifth and a sixth of the detectors in said second array to produce a sixth combined signal of magnitude which varies with the sum of the radiation on the fifth and the sixth of the detectors in said second array;

means connected to receive the first and third of the combined outputs and to produce a first difference output which varies with the difference in magnitude between the first and the third of the combined outputs;
means connected to receive the second and the fifth of the combined outputs and to produce a second difference output of magnitude which varies with the difference in magnitudes between the second and the fifth of the combined outputs;
means connected to receive the first and the fourth of the combined outputs and to produce a third difference output of magnitude which varies with the difference in magnitudes between the first and the fourth combined outputs;
means connected to receive the second and the sixth combined outputs and to produce a fourth difference output of magnitude which varies with the difference in magnitudes between the second and the sixth combined outputs; and
further means connected to receive the first, second, third and fourth difference outputs to produce a resultant output which is indicative of the smallest of the difference outputs.

4. Range sensing apparatus comprising in combination:
a first radiation detection array comprising first, second and third sets of detectors, each set containing three detectors and each detector providing an output indicative of the radiation falling thereon;
a second radiation detection array comprising a plurality of detectors, each providing an output indicative of the radiation falling thereon;
means combining the outputs of the three detectors of the first set of detectors in the first array to produce a first combined output signal, combining the outputs of the three detectors in the second set of detectors in the first array to produce a second combined output signal and combining the outputs of the three detectors of the third set of detectors in the first array to provide a third combined output signal;
combining means operable in a first condition to combine the outputs of a first set of three detectors from the second array to provide a fourth combined output signal, in a second condition to combine the outputs of a second set of three detectors from the second array to provide a fifth combined output signal, and in a third condition to combine the outputs of a third set of three detectors from the second array to provide a sixth combined output signal, the second set of detectors in the second array comprising two of the detectors from the first set of detectors of the second array and an additional detector, while the third set of detectors of the second array comprising one of the detectors that is common to the first and second set of detectors of the second array, the additional detector of the second set of detectors of the second array and an additional detector; said combining means also being operable in the first condition to combine the outputs of a fourth set of three detectors from the second array to provide a seventh combined output signal in the second condition to combine the outputs of a fifth set of three detectors from the second array to provide an eighth combined output signal and in the third condition to combine the outputs of a sixth set of three detectors from the second array to provide a ninth combined output signal, the fifth set of detectors from the second array comprising two of the detectors from the fourth set of detectors in the second array and an additional detector and the sixth set of three detectors in the second array comprising one of the detectors that is common to the fourth and fifth sets of detectors in the second array, the additional detector of the fifth set of detectors in the second array and an additional detector; said combining further means being operable in the first condition to combine the outputs of a seventh set of three detectors from the second array to provide a tenth combined output signal and in the second condition to combine the outputs of an eighth set of three detectors from the second array to provide an eleventh combined output signal and in a third condition to combine the outputs of a ninth set of three detectors from the second array to provide a twelfth combined output signal, the eighth set of detectors of the second array comprising two of the detectors from the seventh set of detectors in the second array and an additional detector and the ninth set of detectors in the second array comprising one of the detectors common to the seventh and eighth sets of detectors in the second array, the additional detector of the eighth set of detectors in the second array and an additional detector;
comparing means connected to said combining means and operable during the first condition to compare the first combined output with the fourth combined output so as to produce a first resultant signal which varies with the difference between the first and fourth combined outputs during the second condition to compare the first combined output with the fifth combined output and to produce a second resultant output signal which varies with the difference between the first and the fifth combined outputs and during the third condition to compare the first combined output with the sixth combined output to provide a third resultant signal which varies with the difference between the first and the sixth combined outputs; said comparing means also being operable during the first condition to compare the second combined output with the seventh combined output and to produce a fourth resultant signal which varies with the difference between the second and the seventh combined outputs and during the second condition to compare the second combined output with the eighth combined output so as to produce a fifth resultant signal which varies with the difference between the second and the eighth combined outputs and during the third condition to compare the second combined output with the ninth combined output so as to produce a sixth resultant signal, which varies with the difference between the second and the ninth combined outputs; said comparing means further being operable during the first condition to compare the third combined output with the tenth combined output and to produce a seventh resultant signal, which varies with the difference between the third and the tenth combined outputs and during the second condition to compare the third combined output with the eleventh combined output so as to produce an eighth resultant signal, which varies with the difference between the third and the eleventh combined outputs and operable during the third condition to compare the third combined output with the twelfth combined output so as to produce a ninth resultant signal, which varies with the difference between the third and the twelfth combined outputs;

means connected to receive the first, fourth and seventh resultant outputs and to produce a first final output signal of magnitude which varies with the sum of the first, fourth and seventh resultant outputs;

means connected to receive the second, fifth and eighth resultant outputs and to produce a second final output signal which varies with the sum of the second, fifth and eighth resultant outputs;

means connected to receive the third, sixth and ninth resultant outputs and to produce a third final output which varies with the sum of the third, sixth and ninth resultant outputs; and means connected to receive the first, second and third final outputs and to produce an indication output signal indicative of which of the final outputs is the smallest.

5. Range sensing apparatus comprising in combination:

first radiation sensitive detector means operable to produce a first output of magnitude which varies with the amount of radiation received thereby;

second radiation sensitive detector means operable to produce a second output of magnitude which varies with the amount of radiation received thereby, said first and second detector means being mounted so as to receive radiation from a remote object generally along a first path;

third radiation sensitive detector means operable to produce a third output of magnitude which varies with the amount of radiation received thereby, said third detector means comprising two detector components;

fourth radiation sensitive detector means operable to produce a fourth output of magnitude which varies with the amount of radiation received thereby, said fourth detector means comprising two detector components, one of which is common with said third detector means;

fifth radiation sensitive detector means operable to produce a fifth output of magnitude which varies with the amount of radiation received thereby, said fifth detector means comprising two detector components;

sixth radiation sensitive detector means operable to produce a sixth output of magnitude which varies with the amount of radiation received thereby, said sixth detector means comprising two detector components, one of which is common with said fifth detector means, said third, fourth, fifth and sixth detector means being mounted so as to receive radiation from the remote object generally along a second path when the object is at a first range and along a third path when the object is at a second range; and comparing means connected to said first, second, third, fourth, fifth and sixth detector means for comparing the first output with the third output and with the fourth output and comparing the second output with the fifth output and with the sixth output and for producing a final output indicative of the range to the object.

6. Apparatus according to claim 5, wherein said comparing means includes switch means operable in a first condition to produce a first comparison signal which varies with the difference between the first output and the third output and to produce a second comparison signal which varies with the difference between the second output and the fifth output and operable in a second condition to produce a third comparison signal which varies with the differences between the first output and the fourth output and to produce a fourth comparison signal which varies with the difference between the second output and the sixth output.

7. Apparatus according to claim 6 wherein said comparing means further includes summing means connected to receive the first, second, third and fourth comparison signals and operable to produce a first resultant signal which varies with the sum of the first and second comparison signals and a second resultant signal which varies with the sum of the third and fourth comparison signals.

8. Apparatus according to claim 7 wherein said comparing means further includes magnitude sensing means connected to receive the first and second resultant signals and to produce a range signal indicative of an extremum therebetween.

9. Apparatus according to claim 8 wherein the first and second resultant signals are separated in time and said magnitude sensing means includes a series-to-parallel converver.

10. Range sensing apparatus comprising in combination:

first radiation detecting means for producing a first output signal of magnitude which varies with the amount of radiation received by said first detecting means;

second radiation detecting means for producing a second output signal of magnitude which varies with the amount of radiation received by said second detecting means;

third radiation detecting means for producing a third output signal of magnitude which varies with the amount of radiation received by said third detecting means;

means mounting said first, second and third detecting means so that radiation from a remote object following generally along a first path is received by the first, second and third detecting means;

fourth radiation detecting means for producing a fourth output signal of magnitude which varies with the amount of radiation received by said fourth detecting means;

fifth radiation detecting means for producing a fifth output signal of magnitude which varies with the magnitude of the radiation received by said fifth detecting means;

sixth radiation detecting means for producing a sixth output signal of magnitude which varies with the amount of radiation received by said sixth detecting means; said fourth, fifth and sixth detecting means comprising a plurality of individual detector components each having an individual output and comprising connection means for combining predetermined groups of individual outputs to produce the fourth, fifth and sixth output signals, respectively;

means mounting said fourth, fifth and sixth detecting means so as to receive radiation from the remote object, generally over a second path when the remote object is located at a first range, generally over a third path when the remote object is located at a second range and generally over a fourth path when the remote object is located at a third range;

means connected to the connection means of said fourth, fifth and sixth detecting means so as to connect different pluralities of individual detector components together to change the fourth, fifth and sixth outputs, respectively; and means connected to said first, second, third, fourth, fifth and sixth detecting means and operable to compare the first, second and third signals with the fourth, fifth and sixth signals to produce a final signal which varies with the closest coincidence between the radiation received by the first, second and third detecting means and the radiation received by one of the combinations of detector components in the fourth, fifth and sixth detector means.

11. Apparatus for detecting the range to a remote object comprising:

means for producing at a first location a first distribution pattern of radiation from the object;

means for producing a second distribution pattern of radiation from the object, the second distribution pattern being similar to the first distribution pattern and being positioned at a second location when the object is at a first range, at a third location when the object is at a second range and at a fourth location when the object is at a third range;

first, second and third radiation detector means each operable to produce an output which varies with the amount of radiation received thereby;

means for mounting said first, second and third detector means at the first location so that said first detector means receives radiation in a first portion of the first location, said second detector means receives radiation in a second portion of the first location and said third detector means receives radiation in a third portion of the first location;

fourth, fifth and sixth detector means, each comprising a plurality of detector components having individual outputs which vary with the amount of radiation received thereby;

means for mounting said fourth detector means proximate to the second, third and fourth locations so that a first group of detector components in said fourth detector means is in a first portion of the second location, a second group of detector components in the fourth detector means is in a first portion of the third location and a third group of detector components of the fourth detector means is in a first portion of the fourth location, the first portions of the second, third and fourth locations receiving radiation from the remote object similar to that received by the first portion of the first location when the object is at the first, second and third ranges, respectively;

means for mounting said fifth detector means proximate to the second, third and fourth locations so that a first group of detector components of the fifth detector means is in a second portion of the second location, a second group of detector components of the fifth detector means is in a second portion of the third location and a third group of detector components of the fifth detector means is in the second portion of the fourth location, the second portions of the second, third and fourth locations receiving radiation from the remote object similar to that received by the second portion of the first location when the object is at the first, second and third ranges, respectively;

means for mounting said sixth detector means proximate the second, third and fourth locations so that a first group of detector components of the sixth detector means is in a third portion of the second location, a second group of detector components of the sixth detector means is in a third portion of the third location and a third group of detector components of the sixth detector means is in a third portion of the fourth location, the third portions of the second, third and fourth locations receiving radiation from the remote object similar to that received by the third portion of the first location when the object is at the first, second and third ranges, respectively;

connecting means connecting the first group of detector components of the fourth detector means together to produce a first resultant output connecting the first group of detector components of the fifth detector means together to produce a second resultant output and connecting the first group of detector components of the sixth detector means together to produce a third resultant output, said connecting means also connecting the second group of detector components of the fourth detector means together to produce a fourth resultant output connecting the second group of detector components of the fifth detector means together to produce a fifth resultant output and connecting the second group of detector components of the sixth detector means together to produce a sixth resultant output; said connecting means further connecting the third group of detector components of the fourth detector means together to produce a seventh resultant output, connecting the third group of detector components of the fifth detector means together to produce an eighth resultant output and connecting the third group of detector components of the sixth detector means together to produce a ninth resultant output;

comparator means connected to the first and fourth detector means and operable in a first comparison to compare the output of the first detector means with the first resultant output, in a second comparison to compare the output of the first detector means with the second resultant output and operable in a third comparison to compare the output of the first detector means with the third resultant output; said comparator means also connected to said second detector means and said fifth detector means and operable in the first comparison to compare the output of said second detector means with the fourth resultant signal, operable in the second comparison to compare the output of said second detector means with the fifth resultant signal and operable in the third comparison to compare the output of said second detector means with the sixth resultant signal; said comparator means further connected to said third detector means and said sixth detector means and operable in the first comparison to compare the output of said third detector means with said seventh resultant signal operable in the second comparison to compare the output of said third detector means with said eighth resultant signal and operable in the third comparison to compare the output of said third detector means with the ninth resultant signal; and means connected to said comparator means and operable to determine which of the first, second and third comparisons produces an extremum.

12. Apparatus according to claim 1 wherein said first radiation sensing means comprises a set of radiation detectors each operable to produce an output signal of magnitude that varies with the quantity of radiation thereon with the output signals being combined to the first output signal.

13. Apparatus according to claim 12 wherein the pair of radiation detectors of the first radiation sensing means and the first, second and third radiation detectors of the second radiation sensing means all have approximately the same area for receiving radiation from the remote object.

14. Apparatus according to claim 13 wherein the combining means comprises a plurality of transistors and said means connected to said first radiation sensing means and to said combining means comprises a difference detector.

15. Apparatus according to claim 10 wherein:
said first radiation detecting means comprises three individual detector components, each having an individual output signal and means joining the output signals of the three individual detectors together to provide the first output signal;
said second radiation detecting means comprising three individual detector components each having an individual output signal and means joining the output signals of the three individual detectors together to provide the second output signal;
said third radiation detecting means comprising three individual detector components each having individual output signal and means joining the output signals of the three individual detectors together to provide the third output signal; and
said means connected to the connection means of said fourth, fifth and sixth detecting means operating in a first condition to combine the outputs of a first three individual detector components of said fourth detecting means to produce the fourth output signal, to combine the outputs of a first three individual detector components of said fifth detecting means to produce the fifth output signal and to combine the outputs of a first three individual detector components of said sixth detecting means to produce the sixth output signal, operating in a second condition to combine the outputs of a second three individual detector components of said fourth detecting means to produce the fourth output signal, to combine the outputs of a second three individual detector components of said fifth detecting means so as to produce the fifth output signal and to combine the outputs of a second three individual detector components of said sixth detecting means so as to produce the sixth output signal and operating in a third condition to combine the outputs of a third three individual detector components of said fourth detecting means to produce the fourth output signal, to combine the outputs of a third three individual detector components of said fifth detecting means to produce the fifth output signal and to combine the outputs of a third three individual detector components of said sixth detecting means to produce the sixth output signal.

16. Apparatus according to claim 11 wherein the first, second and third groups of detector components of said fourth, fifth and sixth detector means comprise three radiation detectors each and the combined area for receiving radiation on each group is approximately the same as the area for receiving radiation on the first, second and third radiation detecting means respectively.

17. Apparatus according to claim 16 wherein two of the detector components of the second group of three detector components of the fourth, fifth and sixth detector means are common with the first group of three detector components and wherein two of the detector components of the third group of three detector components of the fourth, fifth and sixth detector means are common with the second group of the detector components.

18. Apparatus according to claim 17 wherein the connecting means comprises a plurality of transistors each having an electrode connected to a detector component and including means operable to bias certain of the transistors to an on condition while biasing others of the transistors to an off condition so as to produce the resultant outputs at another terminal of the transistors which are in an on condition.

19. Apparatus according to claim 18 wherein the comparator means comprises first, second and third difference detecting means each having a first input connected to one of said first, second and third detector means respectively and each having a second input connected to said comparator means so that the first difference detecting means receives the first, second and third resultant outputs, the second difference detecting means receives the fourth, fifth and sixth resultant outputs and the third difference detecting means receives the seventh, eighth and ninth resultant outputs, said first, second and third difference detecting means each producing a difference output representative of the difference between the two inputs thereto for each of the three comparisons.

20. Apparatus according to claim 19 wherein said means connected to said comparator means includes means connected to the first, second and third difference detecting means to combine the outputs so as to produce a first combined signal representative of the sum of the three difference outputs in the first comparisons, to produce as second combined signal representative of the sum of the three difference outputs in the second comparison and to produce a third combined signal representative of the sum of the three difference outputs in the third comparison; and including minimum determining means for determining which of the first, second and third combined signals is smallest.

21. Apparatus according to claim 20 wherein said minimum determining means comprises means for inverting the magnitude of the first, second and third combined signals and determining which of the inverted combined signals is largest.

* * * * *